United States Patent [19]
Fujii et al.

[11] Patent Number: 5,873,086
[45] Date of Patent: Feb. 16, 1999

[54] COMMUNICATIONS CONTROL APPARATUS AND CLIENT/SERVER COMPUTER SYSTEM

[75] Inventors: Yasushi Fujii, Kawasaki; Hideo Imura, Kobe; Yasuhiko Hashizume, Kawasaki, all of Japan

[73] Assignee: Fujitsu Limited, Kawasaki, Japan

[21] Appl. No.: 968,477

[22] Filed: Nov. 12, 1997

Related U.S. Application Data

[63] Continuation of Ser. No. 433,732, May 3, 1995, abandoned.

[30] Foreign Application Priority Data

May 10, 1994 [JP] Japan ................... 6-121957

[51] Int. Cl.⁶ .................................................. G06F 17/30
[52] U.S. Cl. .................................................. 707/10
[58] Field of Search ................................. 707/10

[56] References Cited

U.S. PATENT DOCUMENTS

| | | | |
|---|---|---|---|
| 4,855,906 | 8/1989 | Burke | 395/600 |
| 5,257,369 | 10/1993 | Skeen et al. | 395/650 |
| 5,265,250 | 11/1993 | Andrade et al. | 395/650 |
| 5,291,416 | 3/1994 | Hutchins | 364/474.16 |
| 5,339,392 | 8/1994 | Risberg et al. | 395/161 |
| 5,446,842 | 8/1995 | Schaeffer et al. | 707/103 |
| 5,465,351 | 11/1995 | Lemmo | 395/600 |
| 5,535,120 | 7/1996 | Chong et al. | 704/3 |
| 5,544,354 | 8/1996 | May et al. | 707/4 |
| 5,553,235 | 9/1996 | Chen et al. | 395/182.18 |
| 5,557,798 | 9/1996 | Skeen et al. | 395/650 |
| 5,566,069 | 10/1996 | Clark, Jr. et al. | 364/240 |
| 5,586,312 | 12/1996 | Johnson et al. | 707/10 |
| 5,634,019 | 5/1997 | Koppolu et al. | 345/335 |

*Primary Examiner*—Wayne Amsbury
*Attorney, Agent, or Firm*—Stass & Halsey

[57] ABSTRACT

A communication control apparatus controls the transmission of data between client and server applications in a client/server system. The alteration to the system of a server machine does not affect the client application by temporarily storing the data in an internal database.

The communication control apparatus contains a queue-structure entry table or response table as the database storing data notified of by the client application or the response data by the server application. It also stores the table defining information which defines the format of each table. The data transmitted between the client application and the server application is queued and retrieved on each of the tables.

47 Claims, 30 Drawing Sheets

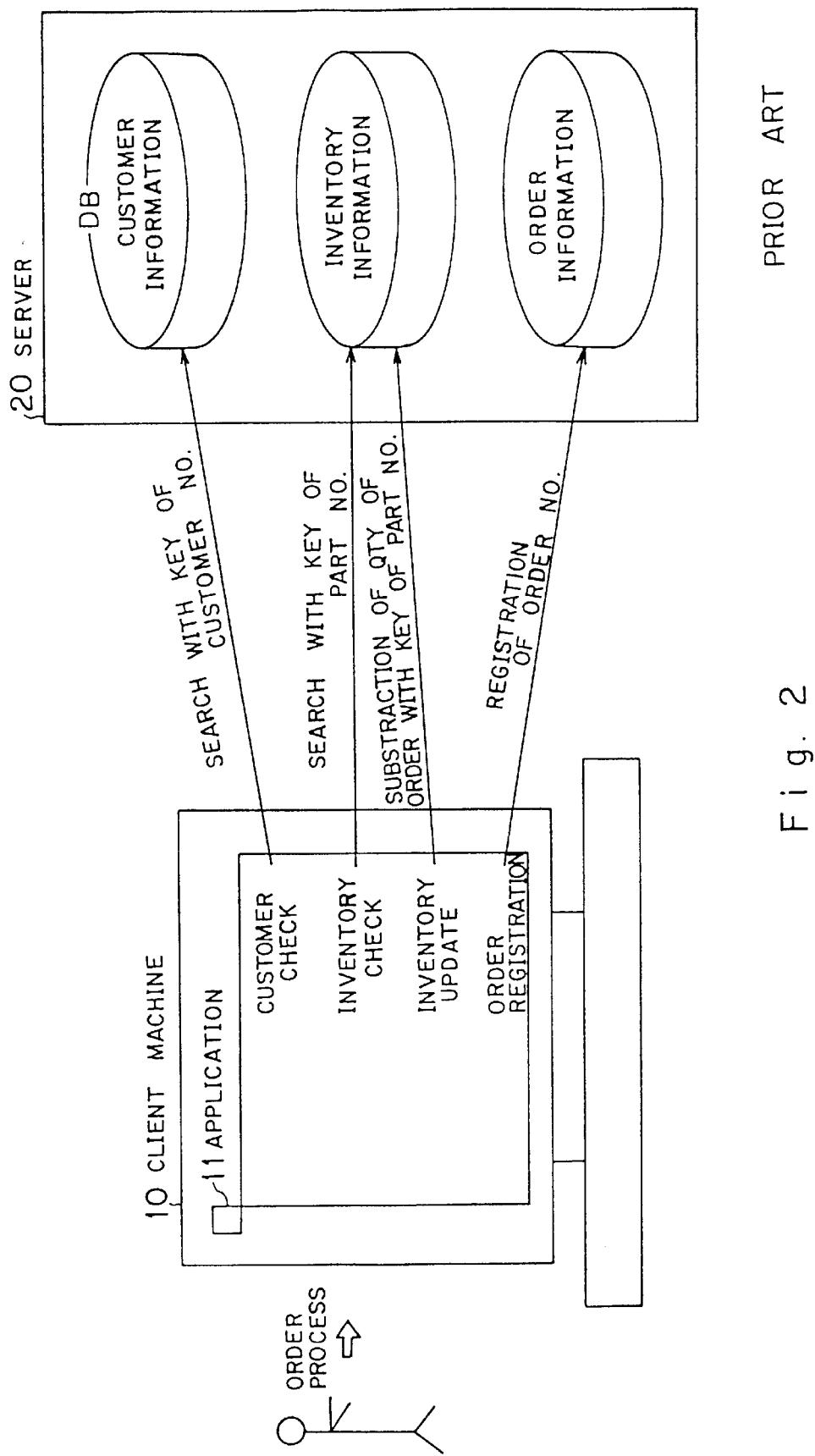

TABLE COLUMN ⇩

| ITEM 1 | ITEM 2 | ITEM 3 | ITEM 4 |
|--------|--------|--------|--------|
|        |        |        |        |

LINE ⇒

TABLE ACCESS RIGHT:User-A, User-B, User-C
ITEM 1 ACCESS RIGHT:User-X, User-Y
ITEM 2 ACCESS RIGHT:User-X, User-Z
ITEM 3 ACCESS RIGHT:User-Y, User-Z

F I G. 3   PRIOR ART

Fig. 4A  TEST FOR BOTH APPLICATIONS

Fig. 4B  TEST FOR ONLY SERVER APPLICATION

Fig. 4C  TEST FOR ONLY CLIENT APPLICATION

PRIOR ART

| LENGTH OF DATA ITEM 1 | CONTENT OF DATA ITEM 1 | LENGTH OF DATA ITEM 2 | CONTENT OF DATA ITEM 2 |

F I G. 1 2

COMMUNICATIONS CONTROL APPARATUS AND CLIENT/SERVER COMPUTER SYSTEM

This application is a continuation of application Ser. No. 08/433,732, filed May 3, 1995, now abandoned.

BACKGROUND OF THE INVENTION

1. Field of the Invention

The present invention relates to a client/server computer system. In particular, the present invention relates to a communication control apparatus for controlling message exchange in a client/server computer system having a front-end process application (client application) that is disposed in a client machine and a back-end process application (server application) that is disposed in a server machine and a client/server system thereof.

2. Description of the Related Art

Personal-computer-based LANs have been widely used as information systems for companies. In addition, client/server systems, in particular, client/server type database systems have become popular.

The client/server type database systems have various advantages over host type centralized database systems. In a multiple vendor environment, database applications can be accomplished. Since the server side and client side can share a process, the performance is high. The end users can develop applications suitable for their job using 4 GL (fourth generation language). The users can edit the results retrieved from the database server using commercial software (packaged software), such as spreadsheet software, through middle-ware. When a distributed database is constructed, data can be distributed. With a mirror function, the loss of data due to the system going down can be minimized. Since a low cost personal computer can be used as a client machine, the total cost of the system can be reduced. When a personal computer is used for a client machine that performs a main job, the efficiency of the job can be improved.

In the client/server type database system, database access types of a database server (computer) machine (referred to as a database server) by a client application mounted on a client machine can be categorized as RDA (Remote Database Access) and RPC (Remote Procedure Call).

In the RDA type of database access, a client application accesses a database using the RDA protocol established by the ISO (International Organization for Standardization). In this case, the client application directly sends a structured query language (SQL) statement that is received through a network to a DBMS (Data Base Management System). The results retrieved from the DBMS is sent to the client application by middle-ware (referred to as the RDA server). Thus, the designer of the client application should know the construction of the database on the database server.

On the other hand, in the RPC type of database access, a server application mounted on the database server is called as a subroutine through the network so as to execute a part (procedure) of a job process. The results are received from the server application, and thereby a distributed application is executed. When the RPC function is used, a harmoniously distributed process can be easily accomplished. In the harmoniously distributed process, one transaction process is distributed into a client machine and one or a plurality of database servers. Thus, with a plurality of UNIX database servers that are relatively smaller machines, a large OLTP (On Line Transaction Process) system can be constructed.

First, a problem of a C/S database system (client/server type database system) in which a client application accesses the database server corresponding to the RDA will be described.

In this type, the developer of the client application should know the construction of the database on the database server. Thus, the database manager who designs the database and the designer who designs the client application should work in liaison with each other.

In addition, the content of the client application mutually affects the construction of the database. Thus, when the manager of the database changes the construction of the database, the manager should consider the influence of the change against the existing client application. Consequently, the database manager should be familiar with the content of the client application.

In such a construction, when the construction of the database is changed (for example, the database is divided or data position is changed), the client application should be inevitably modified.

FIGS. 1A and 1B are an example of a change of the construction of the database. In this case, since the number of items of a table 2 (TABLE1) of a database DB1 of a database server 1 is increased due to an increase of transactions, the access performance is deteriorated. To improve the access performance, as shown in FIG. 1B, the table 2(TABLE1) is divided into a table 3 (TABLE1-1) and a table 4 (TABLE1-2). Thus, a part of a client application 7 on a client machine 6 is corrected from a content (INSERT TABLE1) shown in FIG. 1A to a content (INSERT TABLE1-1, INSERT TABLE1-2) shown in FIG. 1B. Thus, the correcting work results in an increase of the cost. In addition, the client machine cannot be temporarily used.

In addition, the manager of the database server should preform a modification work such as dispersion of load of the database and change of data management unit when the client application is changed. Thus, the period for the modification work available for the manager of the database server is restricted.

To directly open the construction of the table of the database to the user, the table of the database should be designed in consideration of both the use state of the data of the user and the management state of the database. Thus, the table design is very difficult to construct in the system.

As shown in FIG. 2, when an order process is performed in the RDA, a client application 11 requests a database server 20 to perform a process such as a customer check, an inventory check, an inventory update, or an order registration with an SQL statement. Each SQL statement is issued after a response to the former SQL statement has been received from the database server 20. Thus, while the order process is being executed, data is repeatedly exchanged between the client machine 10 and the database sever 20. Consequently, the traffic amount of the network may increases, thereby decreasing the process performance of the system.

In the RDA, a request of an SQL statement from the client application is immediately sent to the DBMS through the RDA server. Thus, even if the system manager establishes the following rules (1) to (4) as database operation rules, he cannot substantially manage/control the operation of the system.

(1) restricts access time (to prohibit the user from accessing a large amount of data and from leaving his seat while accessing the data).

(2) restricts access time zone (to allow the manager to have maintenance time for the database).

(3) controls overload (to prohibit the user to access the database when the database server is overloaded).

(4) controls priority (to dynamically control the execution of each service corresponding to the priority).

Other than the process request method using the SQL statement for accessing the client application corresponding to the RDA, a so-called stored procedure call method is available. In the stored procedure call method, a sequence of transaction processes (procedures) are pre-registered in the database server. By calling a procedure, a predetermined database process is performed. However, in the present situation, since the client application should generate a job logic by accessing the database with the SQL statement and using the stored procedure call, the job logic becomes complicated, thereby preventing the productivity from being improved.

The security function for accessing the database of the existing DBMS is performed for each table and for each column (item). Thus, when each item of data is open to the user, as shown in FIG. 3, the designation of the access right becomes complicated. When a job system is constructed, the access right of the database is usually designated for each user (end user, job manager, etc.). Thus, when the same user works as an end user and a job manager, the access right should be changed for each item of the user. However, the security designator may designate the same user the same right for all items of the same user.

Next, a so-called C/S application type database system will be described. In this database system, applications are categorized as a client application that performs input/output processes for the user interface and a server application that executes job logic for database access. The client application and the server application are mounted on a client machine and a database server, respectively. The client application calls the server application corresponding to the RPC so as to execute the job process. This C/S application type database system has the following problems.

When applications are developed, the format of data exchanged between both the applications, the process time of the server application, and the operation time zone of the server application should be considered.

As the above-described process type, real communication and delayed communication are known. In the real communication, when the server application has completed a process requested by the client application, the client application is informed of the completion of the process.

On the other hand, in the delayed communication, when a message (data) received from the client application is stored without need to wait until the process of the server application has been completed, the client application is informed of the completion of the process.

Thus, when the client application performs the collecting type process that collects data for the sever application on a real time communication basis, if the process time of the server application becomes very long, the reply time for the client application is delayed. In this case, the collecting type process should be changed from "real communication" to "delayed communication". Thus, the development of both the applications has a close relationship to each other. Consequently, it is very difficult to independently develop them. In addition, since the change of the process type affects the logic of the application, both the applications should be changed in many situations, thereby deteriorating the productivity.

Since the client application performs a process for the user interface, the attribute (type) of data to be processed should be suitable for a screen process. On the other hand, since the server application accesses the database and edits the data thereof, the application should be preferably processed with attributes suitable for such processes. Thus, when data is exchanged between the client application and the server application, the data attribute changing process is required on either side.

This process results in an increase of the work load, thereby lowering the productivity of the application.

As shown in FIG. 4A, the operation test for an application that is newly developed cannot be performed unless both the client application 31 and the server application 32 are provided. For a test in the RPC, as shown in FIGS. 4B and 4C, a driver 36 and a stub 37 should be provided.

In other words, when only the server application 32 is tested, a driver that issues a request to the server application 32 instead of the client application 31 should be provided (FIG. 4B). On the other hand, when only the client application 31 is tested, the stub 37 that receives a request from the client application 31 instead of the server application 32 should be provided (FIG. 4C).

On the other hand, an original test supporting tool may be used. In this case, the operation of the tool should be well known.

In addition, since the client application and the server application are in liaison with each other through a TP monitor, they should be generated corresponding to an API (Application Programming Interface) of the TP monitor. Thus, in this situation, it is impossible to construct the C/S application type database system corresponding to the RPC using commercial package software (such as spreadsheet software, database, or access software) mounted on a PC (personal computer) as a client application.

In addition, in the existing C/S application type database system, the server application designated by the client application corresponding to the RPC is operated only in the same executing environment on the database server. In other words, the same server application can be used in one job process. Thus, when the existing server application is used for a new job process, the name should be changed. Consequently, various jobs involving the name change are required.

In other words, as shown in FIG. 5, in a system that is operating, a client application 41 calls a server application A. Thereafter, so as to extend the job, using the server application A, a new client application 42 is developed (1). Since the new job process becomes another executing environment, the server application A should be managed by a server application A' with another name (2). However, in this case, when the server application A is corrected due to an occurrence of a trouble, not only the server application A, but the server application A' should be corrected (3). In other words, the same server application A should be dually managed, thereby increasing the maintenance work.

SUMMARY OF THE INVENTION

The object of the present is to provide a communications control device and a client/server system equipped with the communications control device which enables the development and alteration of client and server applications to be performed independently in a client/server system and enables the structure of a database to be altered without modifying the client application.

The communications control device according to the present invention comprises a first database storing data transmitted between a client application and a server application and a control portion for controlling the data communications between the client application and the server application by temporarily storing in the first database the data received from the client or server application.

According to the present invention, temporarily storing data in the first database in data communications between the client and server applications enables the structure of the database to be successfully changed in the server application. Therefore, changing the structure of the database in server equipment does not require a change of the client application.

Furthermore, the communications control device according to the present invention has the process of the data communications provided for the client and the information defining the format of the table storing data in the process be entered as published service information.

Thus, the client application generates data to be transmitted taking only the published service information into account without considering the structure of the database in the server equipment.

The format of the table functions as an application programming interface (API) to the client and server applications. Therefore, the client and server applications need not take each other into account, thereby enabling each of the applications to be generated independently in the above described table format.

BRIEF DESCRIPTION OF THE DRAWINGS

FIG. 2 is a schematic diagram for explaining a problem of a conventional client/server database system that accesses a database corresponding to RDA (No. 2);

FIG. 3 is a schematic diagram for explaining a problem of a conventional client/server database system that accesses a database corresponding to RDA (No. 3);

FIG. 12 is a schematic diagram for explaining a format of data queued in a communication buffer;

DESCRIPTION OF THE PREFERRED EMBODIMENTS

Figure 6:
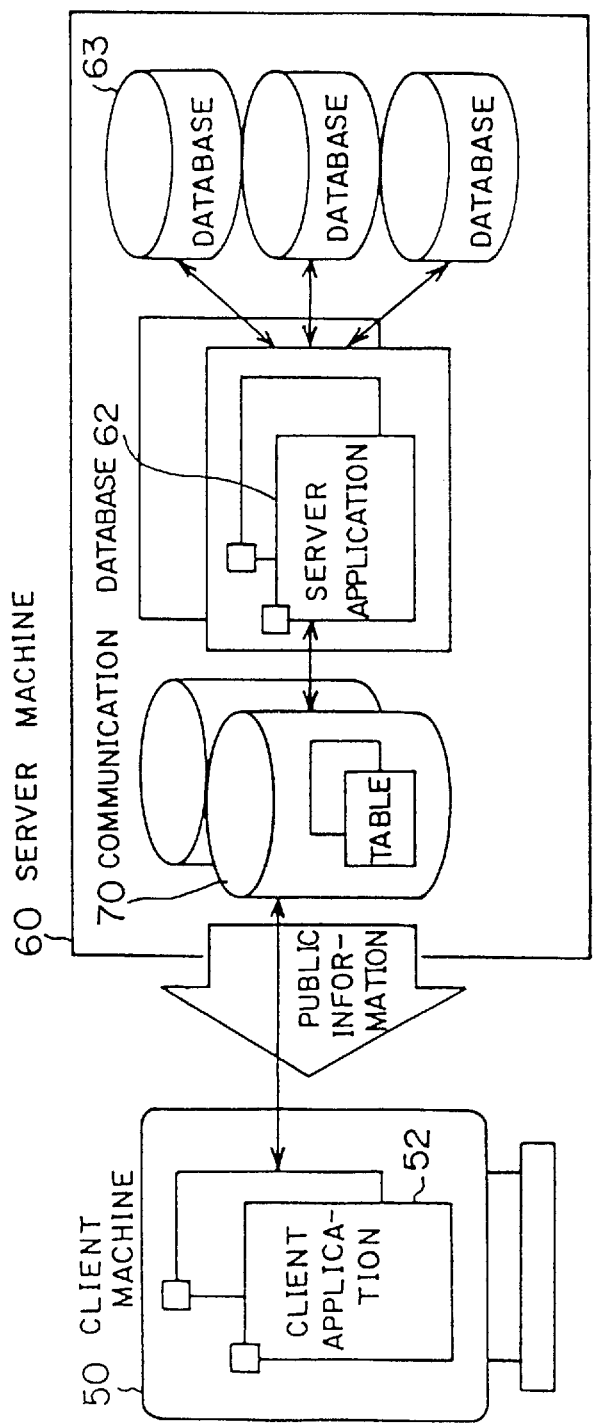
FIG. 6 is a schematic diagram for explaining the theory of the present invention.

FIG. 6 is a schematic diagram for explaining the theory of the present invention.

The present invention is a client/server system that executes a job process by a client application 52 mounted on a client machine 50 and a server application 62 mounted on a server machine 60. The client/server system is a communication control apparatus that controls information exchange between the client application 52 and the server application 60.

The client/server system shown in FIG. 6 includes a communication database (communication DB70) between a client application 52 in a client machine (computer) 50 and a server application 62 in a server machine (computer) 60. The communication DB 70 stores public information open (provided) to a client and information being input from the client as a database and retrieves information to be sent to the server application from the database (not shown). The server application 62 receives the information retrieved from the database and accesses the database 63.

Figure 7:
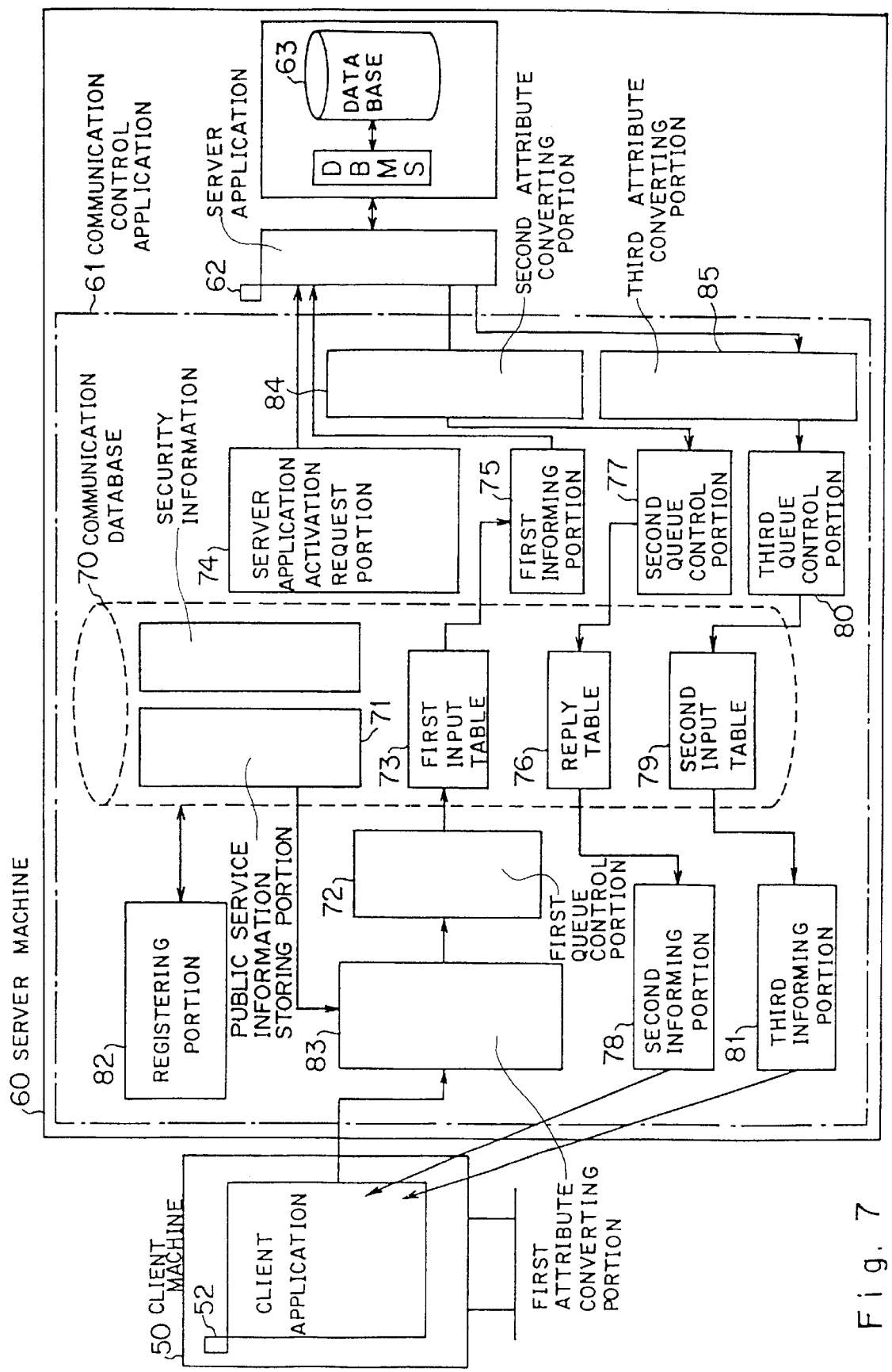
FIG. 7 is a schematic diagram showing a theoretical construction of the present invention.

FIG. 7 is a block diagram showing a theoretical construction of the present invention.

The communication database 70 in FIG. 7 includes a public service information storing portion 71 and a first input table 73.

The public service information storing portion 71 stores public service information that defines the format of a table used for the service open (provided) to the client or a process type of the service.

The process type of the service is, for example, one of a real communication collecting type and delayed communication collecting type.

The first input table 73 is a table defined by the public service information registered in the public service information storing portion 71.

A first queue control portion 72 queues data to be stored in the first input table 73 to the first input table 73.

The first queue control portion 72 informs a requesting client application 52 of the completion of a requested process for example when the data has been queued to the first input table 73.

The first queue control portion 72 does not queue data requested by the client application 52 to the first input table 73 for example when a service of public service information that defines the format of the first input table 73 is caused to be closed.

A server application activation request portion 74 requests the server application 62 to be activated when data is queued in the first input table 73.

The server application activation request portion 74 does not issue an activation request for the server application 62 for example when data to be sent to the server application 62 that is stopped is queued in the first input table 73.

A first informing portion 75 retrieves data (message) to be sent to the server application 62 from the first input table 73 corresponding to a request from the server application 62 executed by an activation request by the server application activation request portion 74 and informs the server application 62 of the data.

The first informing portion 75 references attribute information defined in the public service information and converts an attribute of each item of data retrieved from the first input table into an attribute requested by the server application 62 for example when the data retrieved from the first input table 73 is sent to the sever application 62.

A first attribute converting portion 83 converts an attribute of each item of data received from the client application 52 into an attribute defined in the public service information and outputs the converted attribute to the first queue control portion 72.

A second queue control portion 77 queues data requested by the server application to a reply table 76 defined by the public service information registered in the communication database 70.

A second informing portion 78 informs the client application 52 of data to be sent to the client application 52 queued in the reply table 76 corresponding to a request from the client application 52.

The second informing portion 78 references attribute information defined in the public service definition information and converts an at-tribute of each item of data retrieved from the reply table 76 to an attribute required by the client application 52 for example when the data retrieved from the reply table 76 is sent to the client application 52.

A second attribute converting portion 84 converts an attribute of each item of data received from the server application 62 to an attribute defined in the public service information and outputs the converted attribute to the second queue control portion 77.

With the above listed configuration, the communication database 70 further includes a second input table 79.

The public service information storing portion 71 stores public service information that defines the format of a table used for a service open (provided) to a client or a process type of the service.

The process type of the service open to the client is for example a distributing type.

The second input table 79 is a table defined by the public service information.

A third queue control portion 80 queues data stored in the second input table 79 defined by the public service information registered in the public service information storing portion 71 and received from the server application 62 to the second input table 79.

A third informing portion 81 informs the client application 52 of data to be sent to the client application 52 queued in the second input table 79 corresponding to a request from the client application 52.

The third informing portion 81 references attribute information defined in the public service definition information and converts an attribute of each item of data retrieved from the second input table 79 into an attribute requested by the client application 52 for example when the data retrieved from the second input table 79 is sent to the client application 52.

A third attribute converting portion 85 converts an attribute of each item of data received from the server application 62 into an attribute defined in the public service information and outputs converted attribute to the third queue control portion 80.

A registering portion 82 registers the public service information stored in the public service information storing portion 71.

The server application 62 is a program for a database server that accesses the database and data stored in a table defined by the public service information comprises one or a plurality of items included in each record of one or a plurality of tables in the database.

In this construction, first security information for a client with an access right to the communication database 70 is registered at the communication database 70. In this case, the registering portion 82 may register the first security information. This construction may further comprise a first security check portion (not shown) that references the first security information and determines whether or not to allow a client to issue a connection request to the communication database 70 through the client application 52.

In addition to the above-described construction, second security information for a user with an access right to the public service defined in the public service information is registered at the communication database 70. The registering portion 82 may register the second security information. A second security check portion references the second security information to determine whether or not to allow a client to access a table defined by the public service information through the client application 52.

The present invention is applied to, for example, a client/server system for performing general operations.

At least the public service information storing portion 71, the first input table 73, the reply tale 76, the second input table 79, and the first and second security information are stored in the communication database 70.

Described below is the operations and effect of the client/server system having the above described configuration as shown in FIG. 7.

Since a communication database 70 is disposed as a communication control apparatus between a server application and a client application, the change of the construction of the database 63 on the server machine 60 can be absorbed by the server application 62. Thus, even if the construction of the database 63 of the server machine 60 is changed, it is not necessary to correct the client application 52. In addition, the communication control apparatus of the present invention is constructed as a database, and the client application can access the communication control apparatus as a database. The client application can be generated by considering only public information open (provided) to the client. In other words, it is not necessary to consider the construction of the database on the server machine 60.

When a client application 52 sends data (message) to a server application 62, the data is assembled in a record format of a first input table 73 defined with public service information registered by a public service information storing portion 71. A server machine is requested to store the data in the first input table 73.

This data is sent to the server application 62 through a communication control apparatus in a server machine 60.

In other words, a first queue control portion 72 queues the data to the first input table 73. The queued data is detected by a server application activation request portion 74. Thus, the server application activation request portion 74 requests the server application 62 to be activated.

Corresponding to the activation request, the server application 62 is executed. The communication control apparatus is requested to send the data queued in the first input table 73 to the server application 62.

A first informing portion 75 retrieves data to be sent to the server application 62 and sends it to the server application 62.

As described above, the client application 52 sends data with the same format as a record format of the first input table 73 defined by the public service information to the server application 62. The server application 62 performs a data process such as database accessing with the received data.

In this case, the record format of the first input table 73 defined by the public service information functions as an API (Application Programming Interface) for the client application 52 and the server application 62. Thus, the client application 52 and the server application 62 can be independently generated corresponding to the API without need to consider the other application.

Consequently, even if the construction of the database is changed, it is not necessary to correct the client application 52 rather than the server application 62. Thus, the database manager can change the construction of the database without need to consider the client application 52. A table open to the user and a table constructed on the database can be independently designed.

The first queue control portion 72 informs a requesting client application 52 of the completion of a requested process for example when the data has been queued to the first input table 73. Thus, the delayed communication can be performed.

The first queue control portion 72 does not queue data requested by the client application 52 to the first input table 73 for example when a service of public service information that defines the format of the first input table 73 is caused to be closed. Alternatively, the server application activation request portion 74 does not issue an activation request for the server application 62 for example when data to be sent to the server application 62 that is stopped is queued in the first input table 73. By such control, the manager can prohibit the client/server database system from being accessed for a large amount of data, prohibit a client from leaving his seat while accessing the database, reserve database maintenance time, prohibit data from being input in an overload situation of the database server, and control priorities for various job processes (services).

A first attribute converting portion 83 converts an attribute of each item of data received from the client application 52 into an attribute defined by the public service information and outputs the data with the converted attribute to a first queue control portion 72. The first queue control portion 72 queues the data to the first input table 73.

A first informing portion 75 converts an attribute of each item of data retrieved from the first input table 73 into an attribute requested by the server application 62 and informs the server application 62 of the data with the converted attribute.

Thus, in each job process, the client application 52 and the server application 62 process each item of data corresponding to an attribute (format) suitable to their data process without need to perform a data attribute converting process.

When a second queue control portion 77 receives a data input request from the server application 62, the portion 77 queues the data to a reply table 76 defined by public service information registered by a public service information storing portion 71.

A second informing portion 78 retrieves data to be sent to the client application 52 and informs the client application 52 of the data when the client application 52 issues a data receive request.

Thus, a reply type (inquiry type) job process can be constructed between the client application 52 and the server application 62.

A second attribute converting portion 84 converts an attribute of each item of data received from the server application 62 to an attribute defined in the public service information and outputs the data with the converted attribute to the second queue control portion 77. The second queue control portion 77 queues the data with the converted attribute to a reply table 76.

A second informing portion 78 references attribute information defined in the public service definition information and converts an attribute of each item of data retrieved from the reply table 76 to an attribute required by the client application 52 when the data retrieved from the reply table 76 is sent to the client application 52.

Thus, in the reply type job process, the client application 52 and the server application 62 can process data corresponding to attributes suitable for their process formats without need to perform a data attribute converting process in each application.

A third queue control portion 80 queues data stored in the second input table defined by the public service information registered in the public service information storing portion 71 and received from the server application 62 to the second input table 79. A third informing portion 81 informs the client application 52 of data to be sent to the client application 52 queued in the second input table 79 corresponding to a request from the client application 52.

Thus, a delivering type process that sends predetermined data and message from the server application 62 to the client application 52 can be performed.

A third attribute converting portion 85 converts an attribute of each item of data received from the server application 62 into an attribute defined in the public service information and outputs the data with converted attribute to the third queue control portion 80. The third queue control portion 80 queues the data to a second input table 79.

Thereafter, a third informing portion 81 references attribute information defined in the public service definition information and converts an attribute of each item of data retrieved from the second input table 79 into an attribute requested by the client application 52 when the data retrieved from the second input table 79 is sent to the client application 52.

Thus, in a delivering type process that sends data from the server application 62 to the client application 52, the server application 62 and the client application 52 can process data corresponding to attribute suitable to their process formats without need to perform a data attribute converting process.

A registering portion 82 registers the public service information stored in the public service information storing portion 71. Thus, not only when a system design work is performed after the system has been installed, but while the system is being operated, a new job process can be added. In other words, by registering public service information suitable for a new job process to the storing portion 71 and generating the client application 52 and the server application 62 corresponding to the public service information, a new job process can be constructed.

The communication control apparatus according to the present invention is applied to a client/server type database system. In this case, the server application 62 is a program for a database server that accesses the database and data stored in a table defined by the public service information is composed of one or a plurality of items included in each record of one or a plurality of tables in the database or one or a plurality of items included in each record distributed to a plurality of databases.

Thus, the server application 62 accesses a plurality of tables of a database corresponding to data received from the client application 52 and performs various data processes (retrieving, correcting, and editing data). Thus, a function similar to the RPC (Remote Procedure Call) can be accomplished.

When a client issues a connection request to the communication database 70 through a client application 52, a first security check portion references the first security information of the client with an access right to the communication database 70 and determines whether or not to allow the client to access the communication database 70.

Thus, the system can be protected from an illegal access to the communication database 70.

When a client issues an access request to a table defined by the public service information through the client application 52, a second security check portion references the second security information of the client with an access right to the table defined by the public service information registered in the public service information storing portion 71 and determines whether or not to allow the client to access the table.

Thus, the system can be prevented from an illegal access to the table defined by the public service information.

In addition, the manager can register the first and second security information to the database 70 through the registering portion 82. In this case, the manager can designate a client an access right for each table defined by the public service information. Thus, an access right to the database on the database server can be easily designated.

Figure 8:
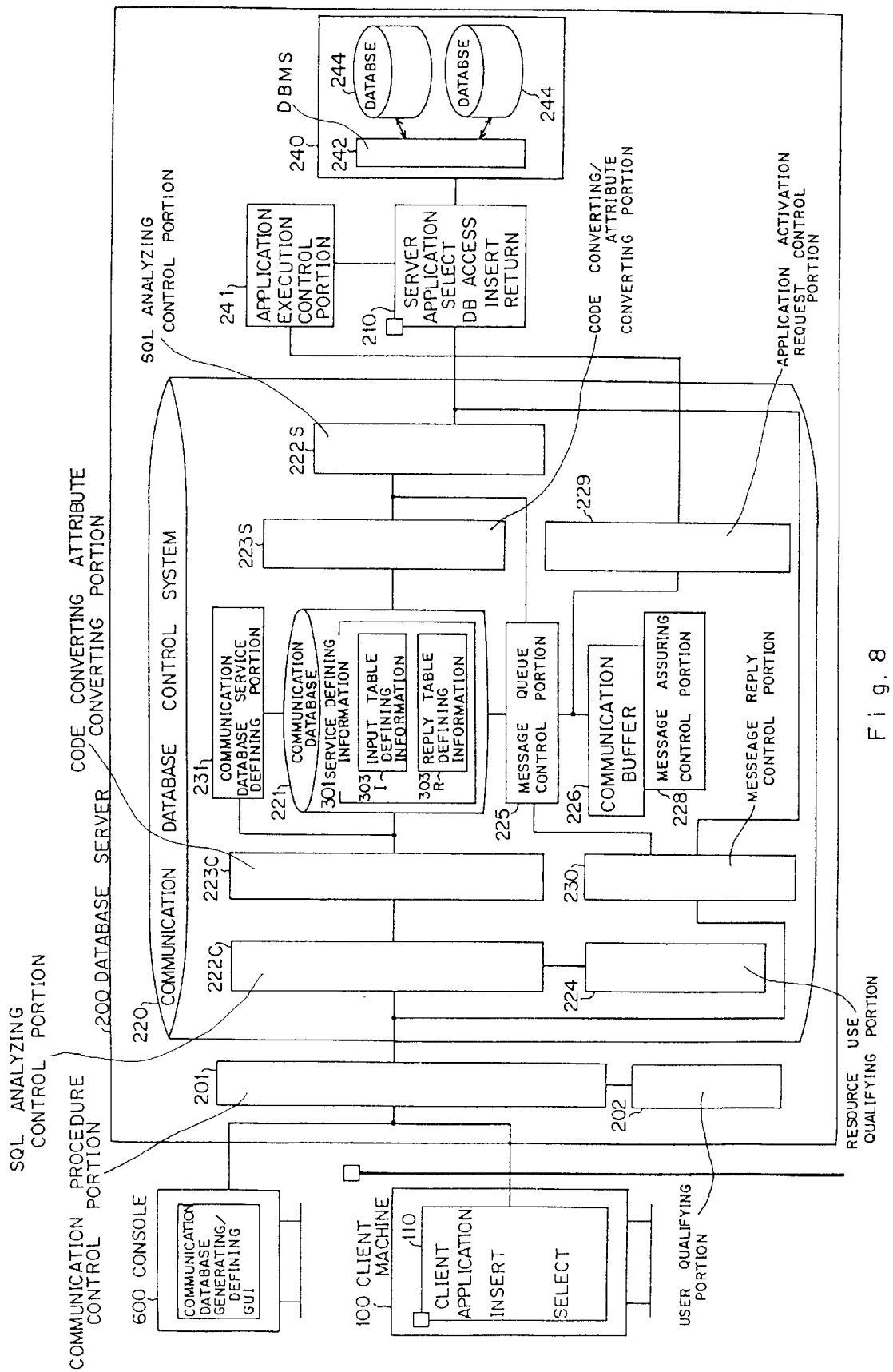
FIG. 8 is a block diagram showing a system construction of an embodiment of the present invention.

FIG. 8 is a block diagram showing the construction of a system according to the embodiment of the present invention.

In FIG. 8, a client machine 100 and a database server 200 are connected through an LAN (Local Area Network) or WAN (Wide Area Network). A console 600 is connected to the data server 200. This system is a client/server application type database system. The client machine 100 mounts a client application 110. The database server 200 mounts a server application 210. The client application 110 and the server application 210 jointly executes a job process.

The database server 200 contains a communication DB control system 220. The communication DB control system 220 is disposed between the client application 110 and the server application 210 so as to provide an API (Application Program Interface) therebetween. The communication DB control system 220 includes a communication DB 221 that provides the user (client) for various public services. The client application 110 and the server application 210 are generated corresponding to the public services.

The database server 200 has a database system 240. The database system 240 is constructed of a DBMS (Database Management System) 242 and a database (DB) 244.

The server application 210 accesses the database system 240 and performs processes corresponding to the services (such as updating and referencing database and editing retrieved data).

A communication procedure control portion 201 sends and receives a message (data) to and from the client application 110 through a network corresponding to a communication protocol such as a TCP/IP protocol. When the communication procedure control portion 201 receives an SQL statement (INSERT) from the client application 110, the communication procedure control portion 201 performs a user qualifying process that determines whether or not the user who has executed the client application 110 can access the database server 200.

In reality, a user qualifying portion 202 executes the user qualifying process corresponding to a request received from the communication procedure control portion 201.

When the user accesses the communication DB 221, he should log in the database server 200. At this point, the client machine 100 sends a user identifier and a password to the database server 200. Thereafter, the user identifier and the password are received by the communication procedure control portion 201.

The user qualifying portion 202 receives the user identifier and the password from the communication procedure control portion 201. Corresponding to the user identifier and the password, the user qualifying portion 202 determines whether or not he has a user qualification to have a service of the database server 200 and an access right to the communication DB 221. At this point, the user qualifying portion 202 references security information registered in the communication DB 221 (that will be described later). The user qualifying portion 202 sends the determined result to the communication procedure control portion 201.

When the client application 110 requests the user qualifying portion 202 to execute an SQL statement, this portion 202 also performs the determining process for the user qualification.

When the communication procedure control portion 201 has determined that the requester of the SQL statement has an access right, the portion 201 sends the SQL statement and the user identifier of the requester to an SQL analyzing control portion 222C of the communication DB control system 220.

Next, each block of the communication DB control system 220 will be described.

The communication DB (communication database) 221 is a special database that handles tentative data that is exchanged between the client application 110 and the server application 210. The communication DB 221 provides two data management languages (DML) that are "INSERT" and "SELECT" as an API for the client application 110 and the server application 210.

Figure 9:
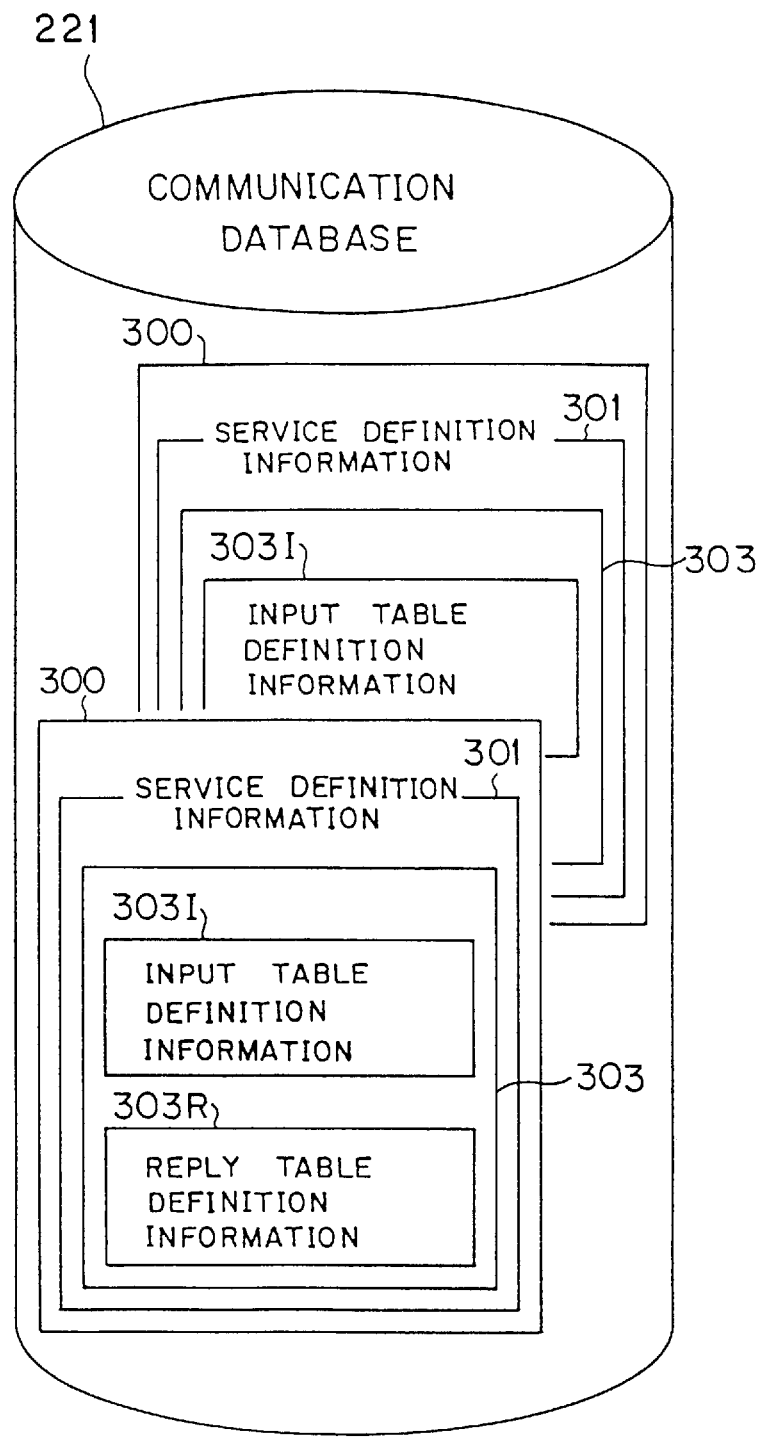
FIG. 9 is a schematic diagram for explaining an inner construction of communication data.

FIG. 9 is a schematic diagram showing an inner construction of the communication DB 221.

As shown in FIG. 9, a plurality of public service information 300 are registered in the communication DB 221. The public service information 300 is registered for each service open to the user. The public service information 300 is composed of service definition information 301 and table definition information 303 included therein. The service definition information 301 defines data process types of public services and link information to the server application 210 that executes the services. The service definition information 301 includes the following items (1) to (4).

(1) Service name,
(2) Data process type,
(3) Name of server application 210 to which data (message) being input by client application 110 is sent, and
(4) User ID/group ID of user to which service is open.

The service definition information 301 has only input table definition information 303I or both the input table definition information 303I and reply table definition information 303R corresponding to data process types.

FIGS. 10A, 10B, 10C and 10D show data process types (2).

The communication methods of various data process types are categorized as a real communication and a delayed communication. In FIGS. 10A to 10D, an input table 351 functions as a queue (request queue) of data that the client application 110 informs the server application 210 with an "INSERT" statement. On the other hand, a reply table 352 functions as a queue (response queue) of which the server application 210 informs the client application with the "INSERT" statement.

Figures 10A, 10B, 10C, 10D:
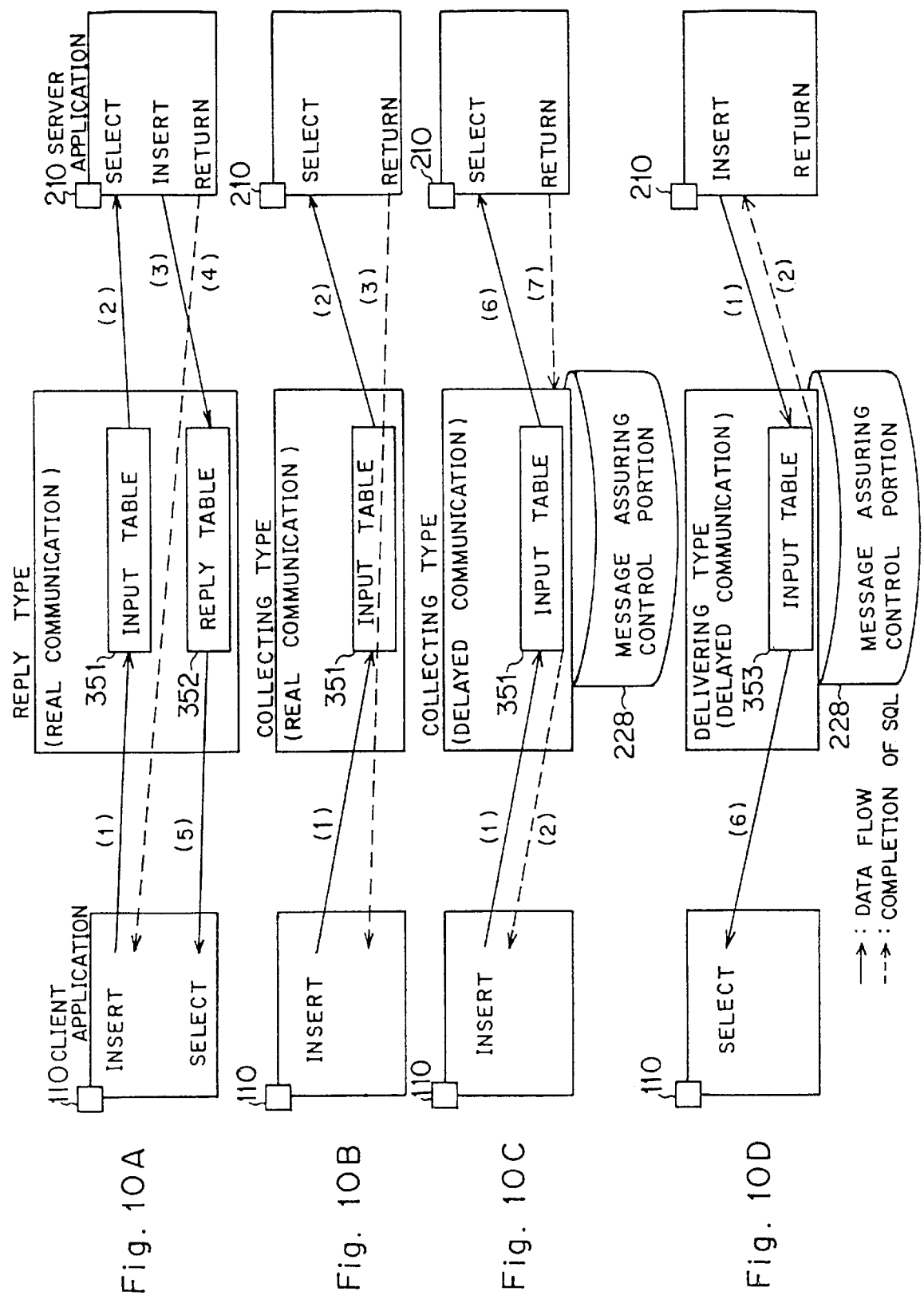
FIGS. 10A, 10B, 10C and 10D are schematic diagrams for explaining the operation of a data process type that is set to service definition information.

FIG. 10A is a schematic diagram for explaining a reply type (real communication) data process. In this data process, in one service definition, two tables that are an input table 351 and a reply table 352 are generated.

In the reply type (real communication) data process, the client application 110 assembles request data and requests the database server 200 for the data with the "INSERT" statement (1). This data is queued to the input table 351. When the server application 210 issues the "SELECT" statement, the server application 210 reads the queued data (2). The server application 210 accesses the database system 240 corresponding to the data being read so as to perform check and predetermined processes. Thereafter, the server application 210 queues the processed results to the reply table 352 with the "INSERT" statement (3). When the server application 210 issues a RETURN command, the client application 110 is informed of the completion of the processes (4). After the client application 110 receives the RETURN command, it issues the "SELECT" statement and receives the process results queued in the reply table 352 (5). When the server application 210 detects an error in the data being checked, it informs the client application 110 of the error. As described above, in the reply (real communication) data process, the client application 110 and the server application 120 interactively execute a job process.

FIG. 10B is a schematic diagram for explaining a collecting type (real communication) data process. In this process, only the input table 351 is registered in the service definition information 301. In this process, the client application 110 forcedly send data to the server application 210. In other words, the client application 110 queues data to be sent to the server application 210 to the input table 351 with the "INSERT" statement (1). The server application 210 issues the "SELECT" statement and receives the data (2). In the same manner as shown in FIG. 10A, the server application 210 accesses the database system 240 so as to perform check and predetermined processes. After the server application 210 has completed the processes, it informs the client application 110 of the process results (normal or error) with the RETURN command (3). After the client application 110 has completed the processes, in the same manner as shown in FIG. 10A, it sends the next data to the server application 210. Thus, since data that has not processed does not remains in the database server 200, other jobs are not adversely affected.

FIG. 10C is a schematic diagram for explaining a collecting type (delayed communication) data process. This process is different from the above-described collecting type (real communication) data process in the following points. When the client application 110 sends data (message) to the communication DB control system 220 with the "INSERT" statement (1), the communication DB control system 220 queues the data (message) to the input table 351. When the data is assured, the client application 110 is informed of the completion of the process corresponding to the "INSERT" statement (2). In this case, the message data of the client application 110 is stacked in a communication data assuring file stored in a nonvolatile storage medium of a message assuring control portion 228 (that will be described later). Thus, the problem of the residual data in the database server 200 is solved.

When the server application 210 becomes active, it issues the "SELECT" statement and receives the message data from the input table 351 (6). After the server application 210 has performed check and predetermined processes, it executes the RETURN command and informs the communication DB control system 220 of the completion of the processes (7).

As described above, in the collecting type (real communication) data process, unless the server application 210 operates, the client application 110 cannot execute the next data process. On the other hand, in the collecting type (delayed communication) data process, regardless of the operation of the server application 210, the client application 110 can immediately execute the next process. Thus, the collecting type (real communication) process and the collecting type (delayed communication) process can be used depending on whether the data to be collected is immediate or not. In other words, when collected data can be immediately used for another process, the real communication is used. When the collected data is processed in a predetermined time range as in a shipping instruction, the delayed communication is used.

FIG. 10D is a schematic diagram for explaining a delivering type (delayed communication) data process. In this process, the server application 210 queues data to be sent to the client application 110 to an input table 353 with the "INSERT" statement (1). When the communication DB control system 220 stacks the message data in a communication data assuring file of the message assuring control portion 228, it sends a completion message to the server application 210 (2). When the client application 110 requires data queued in the input table 353, it issues the "SELECT" statement and receives the data (6).

In this data process, when the client application 110 requires data processed by the server application 210, it receives the data. For example, the database server 200 processes data of another job on batch basis. The process results are sent to the client machine 100.

Table definition information 303I and 303R define the formats of data (record) processed corresponding to the data process type defined by local service definition information 301.

Next, the contents of the table definition information 303I and 303R that define the formats of records queued in the input tables 351 and 353 and the reply table 352 shown in FIGS. 10A to 10D will be described. The contents of both the table definition information are the same and include the following items (1) to (3).

(1) Table name,
(2) All data item names of records,
(3) Attributes of all data items (data types: CHARACTER, NUMERIC, INTEGER, . . . ), and
(4) Data length of each data item The above-described public service information 300 is open to the user as an API for constructing a job process (namely information for generating the client application 110). In other words, the public service information 300 is a public service for which the database server 200 can provide the user so as to construct a job process.

As public services, there are reservation services, inquiry services, order service, and so forth.

In addition, corresponding to the content of the public service information 300, the server application 210 is developed. In other words, by registering the public service information 300 to the communication DB 221, when the system is designed at the initial stage and after the system has been introduced, a job process can be added and/or changed. In other words, when the system is initially designed or a job process is added or changed after the system has been introduced, the public service information 300 that defines the content of the job process should be registered to the communication DB 221. When the job process is developed or added/changed, the development works of the client application 110 and the server application 210 can be independently performed.

Next, returning to FIG. 8, the other blocks of the communication DB control system 220 will be described.

An SQL analyzing control portion 222C analyzes and determines an SQL received from the client application 110 through the communication procedure control portion 201. In other words, the SQL analyzing control portion 222C analyzes the SQL statement and determines whether or not the user has an access right to access the resource (table) of the communication DB 221. When the user has a proper access right, the registered data of the SQL statement to the input table of the communication DB 221 is output to a code converting/attribute converting portion 223C. The access right of the user to the table is determined by a resource use qualifying portion 224.

The resource use qualifying portion 224 receives a user identifier of an executer of the client application 110 that has sent the SQL statement through the SQL statement analyzing control portion 222C and the information of the table of the communication DB 221 that the SQL statement accesses and determines whether or not the user has the access right to the table corresponding to security information (that will be descried later) of the table registered in the communication DB 221. The resource use qualifying portion 224 sends the determined result to the SQL analyzing control portion 222C.

The code converting/attribute converting portion 223C converts a code and an attribute for the data specified by the SQL analyzing control portion 222C with reference to a table definition information 303 of service definition information 301 in the communication DB 221. The converted data is returned to the SQL analyzing control portion 222C. The SQL analyzing control portion 222C instructs a message queue control portion 225 to queue the received data on an input table 351.

The code conversion is performed between different machine systems. For example, conversions of shift JIS<-->EUC, EBCDIC<-->EUC, and so forth are preformed.

On the other hand, the attribute convention is performed in such a manner that the attribute of received data is converted into an attribute of the input table of the communication DB 221. For example, a conversion of DECIMAL→INTEGER is performed.

The message queue control portion 225 performs a waiting control (queue control) that waits for a message data issued from the client application 110 and the server application 210. When the waiting control is performed, the input tables 351 and the 353 and the reply table 352 shown in FIGS. 10A to 10D are used. The tables 351 to 353 are generated by the message queue control portion 225 in memory.

Figure 11:
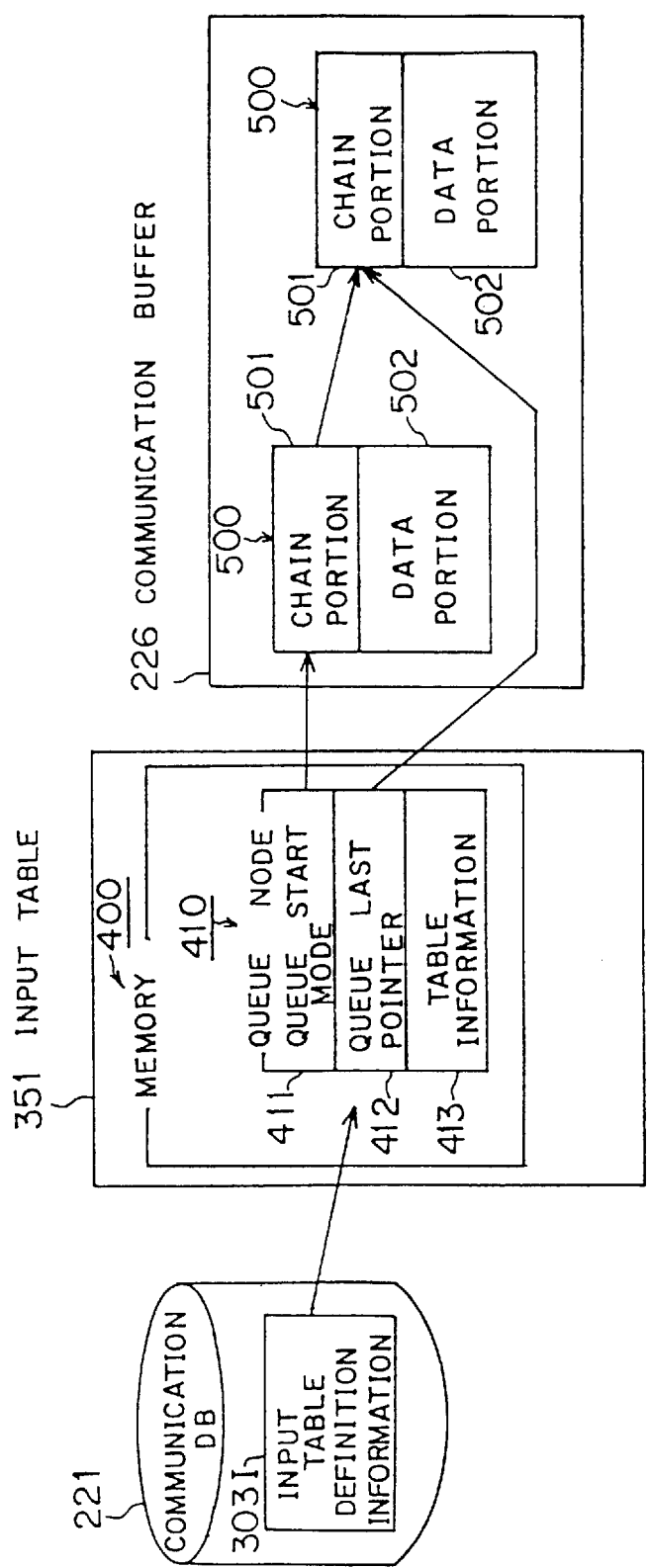
FIG. 11 is a schematic diagram for explaining a construction of an input table.

FIG. 11 is a schematic diagram for explaining how the message queue control portion 225 generates the tables 351 to 353. In FIG. 11, the construction and the generating method of the input table 351 for the public service that performs for example the collecting type data process.

The message queue control portion 225 reads input table definition information 303I that defines the format of the input table 351 registered in the communication DB 221 from the public service information 300 and generates a queue node 410 in the memory 400. The queue node 410 is composed of a queue start pointer 411, a queue last pointer 412, and table information 413. The content of the table information 413 is the same as that of the input definition information 303I. The queue node 410 manages a linking-list-structured queue generated in the communication buffer 226.

The queue is a link-structured list in which a cell 500 composed of a chain portion 501 and a data portion 502 is connected by a pointer in the chain portion 501. The data portion 502 stores message data supplied from the client application 110 to the server application 210. The message queue control portion 225 controls the queue start pointer 411 and queue last pointer 412 of the queue node 410 and the chain portion 501 of the cell 500 so as to perform the queuing control of the message data that is input to the input table 351 or retrieved from the input table 351.

FIG. 12 is a schematic diagram showing the format of data queued in the communication buffer 226. Each data portion 502 comprises the length of the data item and the content of the data item.

In FIG. 11, only the construction of the input table 351 is shown. However, the reply table 352 and the input table 353 are constructed in the same manner as the input table 351 by the message queue control portion 225.

The message assuring control portion 228 shown in FIG. 8 is provided for preventing message data from disappearing due to various error states (such as power off) of the database server 200 while message data is being sent from the database server 200 to the server application 210 or the client application 110 in the delayed communication data process (namely, collecting type delayed communication or delivering type delayed communication). The message data is stored in a communication data assuring file (not shown) of a non-volatile storage medium.

An application activation request control portion 229 requests the application execution control portion 241 to activate the designated server application 210 when the message data has been queued in the input table 351.

When the application execution control portion 241 receives such a request, it activates the server application 210.

When the server application 210 is activated, it issues the SQL statement (SELECT statement) to the SQL analyzing control portion 222S of the communication DB control system 220.

The SQL analyzing control portion 222S requests the message queue control portion 225 to retrieve the message data from the queue of the input table 351 requested by the SQL statement. The retrieved message data is sent to the code converting/attribute converting portion 223S.

The code converting/attribute converting portion 223S converts the attribute of the message data into an attribute requested by the server application 210. The converted message data is sent to the SQL analyzing control portion 222S.

The SQL analyzing control portion 222S sends the received message data to the server application 210 so as to inform it of the completion of the SQL statement.

The SQL analyzing control portion 222S receives the data process result (namely, message data to be sent to the client application 110) from the server application 210 that performs the reply type (real communication) data process with the SQL statement (INSERT). The SQL analyzing control portion 222S sends the message data to the code converting/attribute converting portion 223S so as to request it to convert the attribute.

The code converting/attribute converting portion 223S converts the attribute of the message data corresponding to the item attribute information of the replay table 352 designated by the SQL statement in the communication DB 221. The converted message data is sent to the SQL analyzing control portion 222S.

The SQL analyzing control portion 222S requests the message queue control portion 225 to queue the received message data to the reply table 352.

The message queue control portion 225 queues the received message data to the reply table 352. When the message data has been queued to the replay table 352, the message queue control portion 225 informs the server application 210 of the completion of the SQL statement (INSERT) through the SQL analyzing control portion 222S.

When the process has been completed in the real communication, the server application 210 executes the RETURN command so as to request the message reply control portion 230 to send the process request to the client application 110.

The message reply control portion 230 notifies the client application 110 of the execution completion of the SQL statement for the database server 200 through the communication procedure control portion 201.

A communication DB service defining portion 231 registers, updates, or deletes the public service information 300 to or from the communication DB 221. For example, the communication DB service defining portion 231 receives the SQL statement of the DDL (Data Definition Language) type from the console 600 so as to register new public service information 300 and update and delete the existing public service information 300. The service definition information 301, the input table definition information 303I, and the reply table definition information 303R can be independently registered, updated, and deleted.

The user who can perform the above-described work is registered to the communication DB 221 when it is generated. The user can interactively perform the above-described work through the GUI (graphical user interface) on the console 600. A program that the user has generated can be executed on the console 600. In addition, the communication DB 221 can be generated directly at an input command through the console 600.

Figure 13:
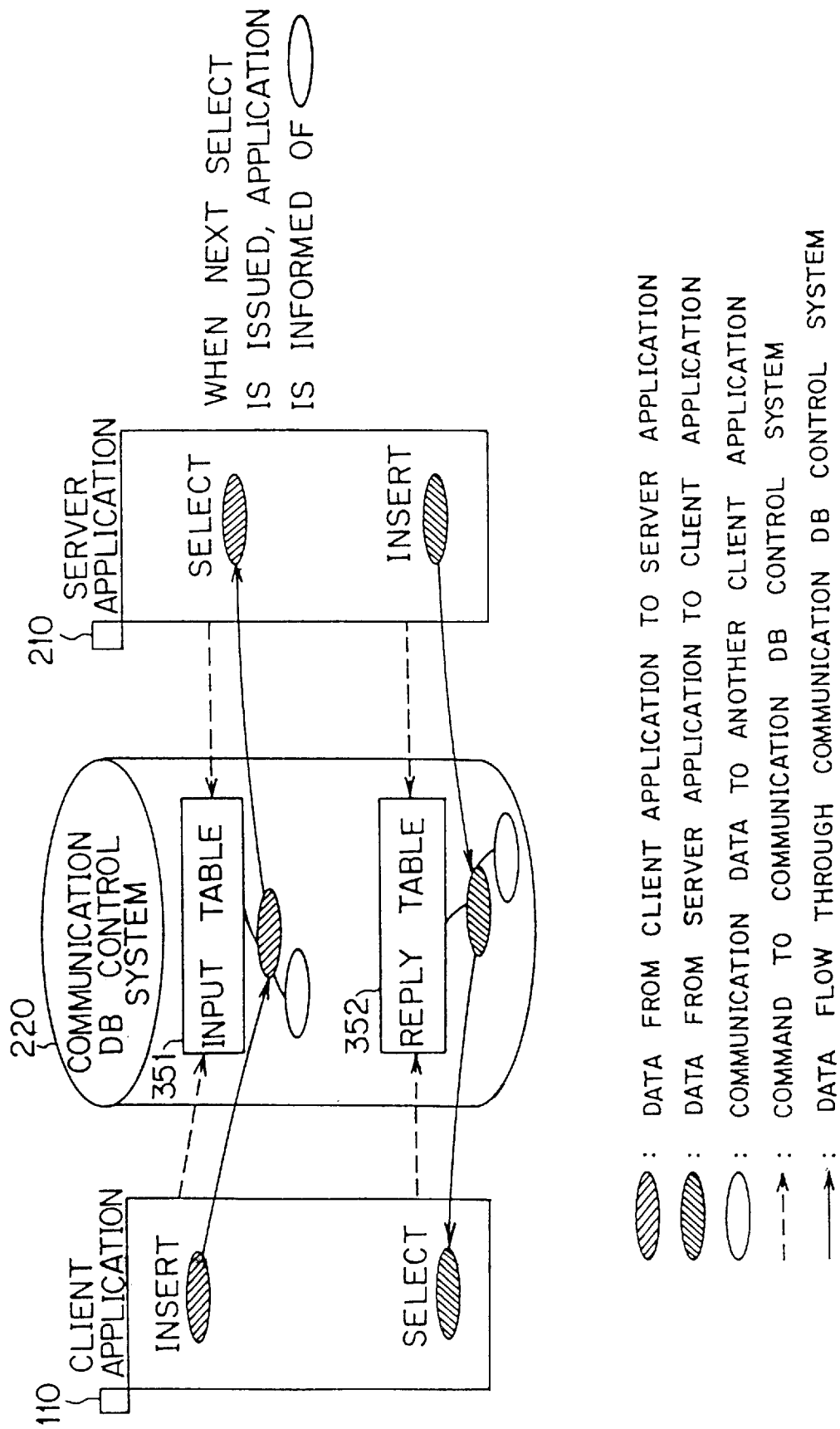
FIG. 13 is a schematic diagram for explaining a command, data flow, and queuing of a data process format reply type.

FIG. 13 is a schematic diagram showing a command for the communication DB control system 220 and a data flow therethrough in the case of the reply type data process. In addition, FIG. 13 shows that communication data between the server application 210 and another client application is stored as functioning as queue in the input table 351 and the reply table 352.

Next, the flows of the four data process types shown in FIGS. 10A to 10D that are performed between the client application 110 and the server application 210 will be described corresponding to the embodiment shown in FIG. 8.

(A) Reply type (real communication) data process

<Client application 110→communication DB control system 220>

(1) When the client application 110 executes the SQL statement (INSERT), the communication procedure control portion 201 receives the SQL statement and qualifies the user through the user qualifying portion 202. When the communication procedure control portion 201 has qualified the access right to the communication DB 221, the portion 201 sends the SQL statement to the SQL analyzing control portion 222C.

(2) The SQL analyzing control portion 222C analyzes the SQL statement and determines the access right to the table designated by the SQL statement through the resource use qualifying portion 224. When the resource use qualifying portion 224 has determined that the access right is valid, the SQL analyzing control portion 222C requests the code converting/attribute converting portion 223C to convert the attribute of the designated data.

(3) The code converting/attribute converting portion 223C converts the code and attribute of the designated data corresponding to the input table definition information 303I registered in the communication DB 221.

(4) The message queue control portion 225 queues the converted data to the input table 351.

<Activation of server application 210.>

(5) The application activation request control portion 229 requests the application execution control portion 241 to activate the server application 210 corresponding to the input table 351.

(6) The application execution control portion 241 activates the server application 210 when it is in receive enable state.

<Communication DB control system 220→Server application 210>

(7) The server application 210 issues the SQL statement (SELECT) to the SQL analyzing control portion 222S so as to receive message data from the input table 351 through the client application 110.

(8) The SQL analyzing control portion 222S analyzes the SQL statement and retrieves the message data from the input table 351 designated by the SQL statement through the message queue control portion 225.

(9) The code converting/attribute converting portion 223S converts the message data into a data attribute for the server application 210 corresponding to a request from the SQL analyzing control portion 222S.

(10) The SQL analyzing control portion 222S sends the converted message data to the server application 210 and informs it of the completion of the SQL statement.

<Server application 210→Communication DB control system 220>

(11) The server application 210 accesses the database system 240 corresponding to the message data and performs the designated data process.

(12) The server application 210 outputs the result of the data process to the SQL statement (INSERT) SQL analyzing control portion 222S.

(13) When the code converting/attribute converting portion 223S receives a request from the SQL analyzing control portion 222S, the portion 223 converts an attribute of the process result (message data to be sent to the client application 110) corresponding to the table attribute of the reply data 352 registered in the communication DB 221.

(14) The message queue control portion 225 queues the message data to the reply table 352 and informs the SQL analyzing control portion 222 of the completion of the queuing.

(15) The SQL analyzing control portion 222S informs the server application 210 of the completion of the process of the SQL statement.

<Completion of server application 210>

(16) When the process has been completed, the server application 210 requests the message reply control portion 230 to inform the client application 110 of the completion of the execution of the SQL statement.

(17) The message reply control portion 230 informs the client application 110 of the completion of the execution of the SQL statement (INSERT) through the communication procedure control portion 201.

<Client application 110→communication DB control system 220>

(18) The client application 110 issues an SQL statement (SELECT) to the database server 200 so as to receive reply data (message data) from the server application 210.

(19) When the communication procedure control portion 201 has received the SQL statement, it qualifies an access right of a user to the communication DB 221 through the user qualifying portion 202. When the user qualifying portion 202 has qualified the access right of the user, it sends the SQL statement (SELECT) to the SQL analyzing portion 222C.

(20) The SQL analyzing control portion 222C analyzes the SQL statement and determines the access right to the designated reply table 352 through the resource use qualifying portion 224. When the resource use qualifying portion 224 has qualified the access right to the designated reply table 352, it retrieves the reply data from the reply table 352 designated by the SQL statement through the message queue control portion 225.

(21) The code converting/attribute converting portion 223C receives a request from the SQL analyzing control portion 222C and converts the reply data into the data attribute for the client application 110.

(22) The SQL analyzing control portion 222C informs the client application 110 of the completion of the SQL statement through the communication procedure control portion 201 along with the converted reply data.

(B) Collecting type (real communication) data process

This process is basically a process excluding the process that issues the SQL statement (INSERT) of the server application 210 from the above-described reply type (real communication) data process. Thus, this process has the following steps.

<Client application 110→communication DB control system 220>

The above-described steps (1) to (4)

<Activation of server application 210>

The above-described steps (5) and (6)

<Communication DB control system 220→server application 210>

The above-described steps (7) to (10)

<Completion of server application 210>

The above-described steps (16) and (17)

(C) Collecting type (delayed communication) data process

Although this process is basically the same as the collecting type (real communication) data process, part of steps differ.

<Client application 110→Communication DB control system 220>

After the above-described steps (1) to (4), the following step (4)' is performed.

(4)' The message queue control portion 225 requests the message assuring control portion 228 to cause the communication data assuring file to store and hold the message data to be sent to the server application 210 queued in the input table 351. When the message queue control portion 225 receives a message that represents the completion of the process from the message assuring control portion 228, the portion 225 requests the message reply control portion 230 to issues a message that represents the completion of the execution of the SQL statement (INSERT) to be sent to the client application 110. When the message reply control portion 230 receives this message, it informs the client application 110 of the completion of the execution of the SQL statement (INSERT) through the communication procedure control portion 201.

<Activation of server application 210>

The above-described steps (5) and (6)

<Communication DB control system 220→server application 210>

The above-described steps (7) to (10)

At the step (8), the message assuring control portion 228 receives a message from the message queue control portion 225 and retrieves message data stored in the communication data assuring file. At this point, the message assuring control portion 228 erases the message data stored in the communication data assuring file.

<Completion of server application 210>

(16)' When the process has been completed, the server application 210 informs the communication DB control system 220 of the completion of the process.

(D) Delivering type (delayed communication) data process

The data flow of this process is reverse of the data flow of above-described (C) collecting type (delayed communication) data process. In other words, (1) <Server application 210→communication DB control system 220>

(2) <Communication DB control system 220→client application 110>

Figure 14:
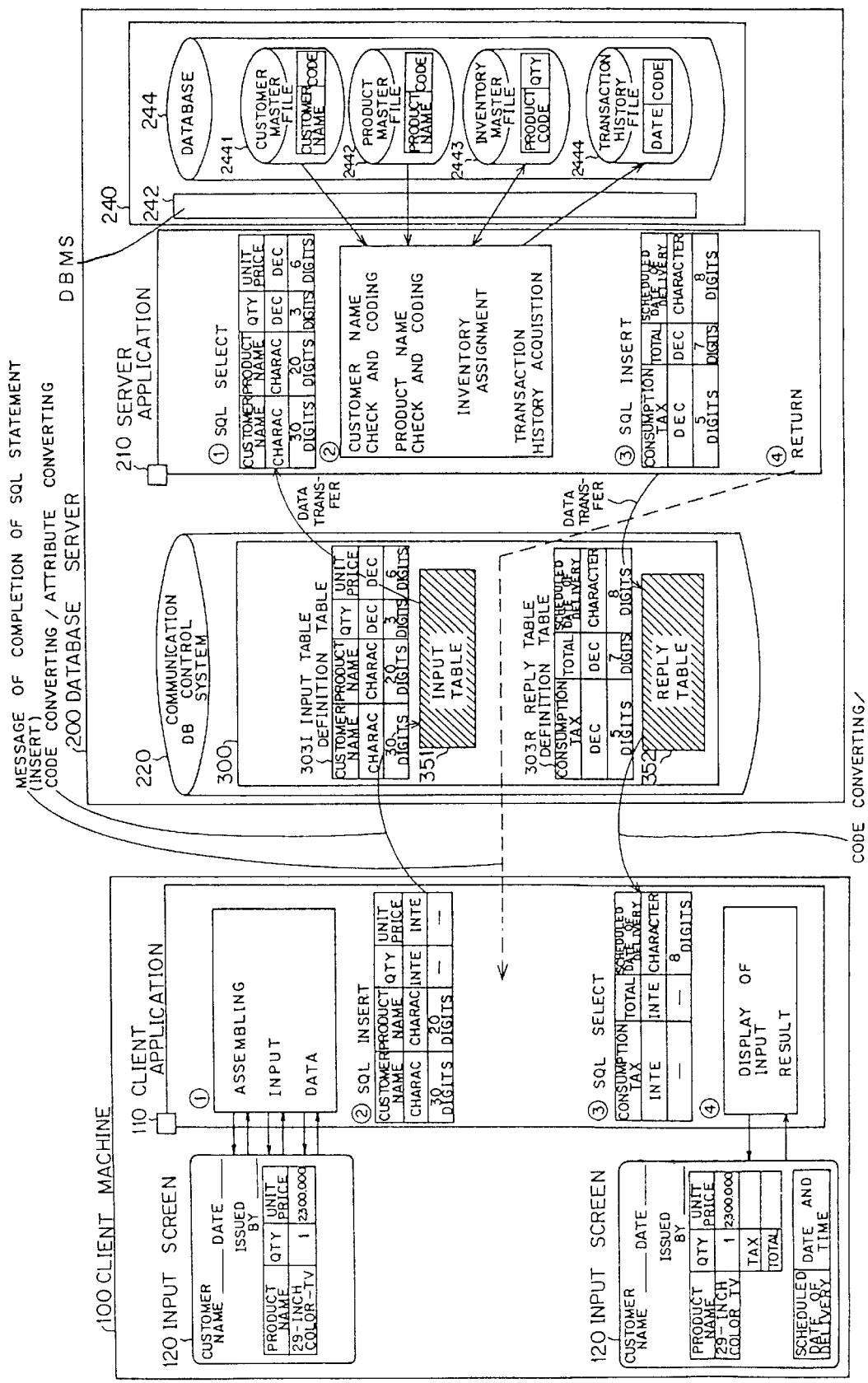
FIG. 14 is a schematic diagram showing a practical example of a reply type (real communication) job process.

FIG. 14 is a schematic diagram showing a real example of the above-described reply type (real communication) data process.

FIG. 14 shows a job process that generates a shipment slip in the case that a customer orders a product (such as a 29-inch color TV set). A client application 110 and a server application 210 that jointly perform such a job process are generated corresponding to public service information registered in a communication DB 221 of a communication DB control system 220 of the database server 200.

As shown in FIG. 14, the public service information 300 registers data process type "reply type" as service definition information 301.

In input table definition information 303I:

(1) As data item names, four items that are "customer name", "product name", "quantity", and "unit price" have been defined.

(2) As attributes of the data items, customer name (character), product name (character), quantity (decimal), and unit price (decimal) have been defined.

(3) As item length of the data items, customer name (30 digits) and product name (20 digits) have been defined.

On the other hand, in replay table definition information 303R:

(1) As data item names, three items that are "consumption tax", "total", and "scheduled date of delivery" have been defined.

(2) As the attributes of the data items, consumption tax (decimal), total (decimal), and scheduled date of delivery (character) have been defined.

(3) As the item length of the data items, consumption tax (five digits), total (seven digits), and scheduled date of delivery (eight digits) have been defined.

As users who can reference or update the public services A provided by the public service definition information 300, user-1 and user-2 have been registered.

The client application 110 generated corresponding to the public service information 300 of the public service A is composed of the following portions (1) to (4).

(1) A process that generates data (input data) queued to the input table 351 of the communication DB 221 of the communication DB control system 220. The input data has a format corresponding to the content of the input table definition table of the public service A. In addition, an input screen for data (customer name, product name, quantity, and unit price) necessary for generating the input data is displayed on a display portion 120. The input data is read from the input screen. This process is a user interface process.

(2) A process that requests the database server 200 to register the input data generated in the process (1) to the input table 351 of the public service A of the communication DB control system 220 with the SQL statement (INSERT).

(3) A process that requests the database server 200 to retrieve the reply result of the server application registered in the reply table 352 of the public service A with the SQL statement (SELECT).

(4) A process that edits the reply result received from the database server 200 in the process (3) and that displays a slip screen on the display portion 120 of the client machine 100.

Since the data format of the replay result has been defined in the reply table definition table 303R of the public service A in the communication DB 221, the editing process is performed corresponding to the definition. Thus, the client application 110 is generated by referencing the public service information 300 of the public service A registered in the communication DB 221 of the database server 200.

On the other hand, the server application 210 that receives a request from the client application 110 through the communication DB control system 220 and that processes the request is generated corresponding to the content of the public service information 300 of the public service A.

The server application 210 is composed of the following portions (1) to (4).

(1) A process that requests the communication DB control system 220 to sends the message data (input data of the client application 110) queued in the input table 351 of the public service A and that receives the message data from the communication DB control system 220.

(2) A process that accesses the database system 240 corresponding to the message data and that references and updates data of files of the database 244 in the database system 240 (these files includes a customer master file 2441, a product master file 2442, an inventory master file 2443, and a transaction history file 2444). In addition, a process that generates data (reply data) registered to the reply table 352 of the public service A of the communication DB control system 220 according to the definition of the reply table definition table 303R of the public service A. This reply data is a reply result of a request of the client application 110 to the database server 200. However, the server application does not need to consider the reply data. Instead, corresponding to the content of the replay table definition table 303R, the reply table can be generated.

(3) A process that requests the communication DB control system 220 to register the reply data to the reply table 352 with the SQL statement (INSERT).

(4) A process that requests the message reply control portion 230 in the communication DB control system 220 to inform the client application 110 of the completion of the execution of the SQL statement (INSERT) with the RETURN command.

The client application 110 and the server application 210 that have been generated in the above-described manner send and receive data through the communication DB control system 220. In this case, the client application 110 accesses the communication DB control system 220 of the database server 200 only twice. In other words, when a request is issued, the input table 351 of the public service A is accessed one time. When the reply result of the request is received, the reply table 352 of the public service A is accessed one time. The server application 210 performs a back end process that searches and updates the database 244 of the database system 240. The server application 210 accesses the communication DB control system 220 only twice (the input table 351 and the reply table 352 are accessed one time each).

Figure 15:
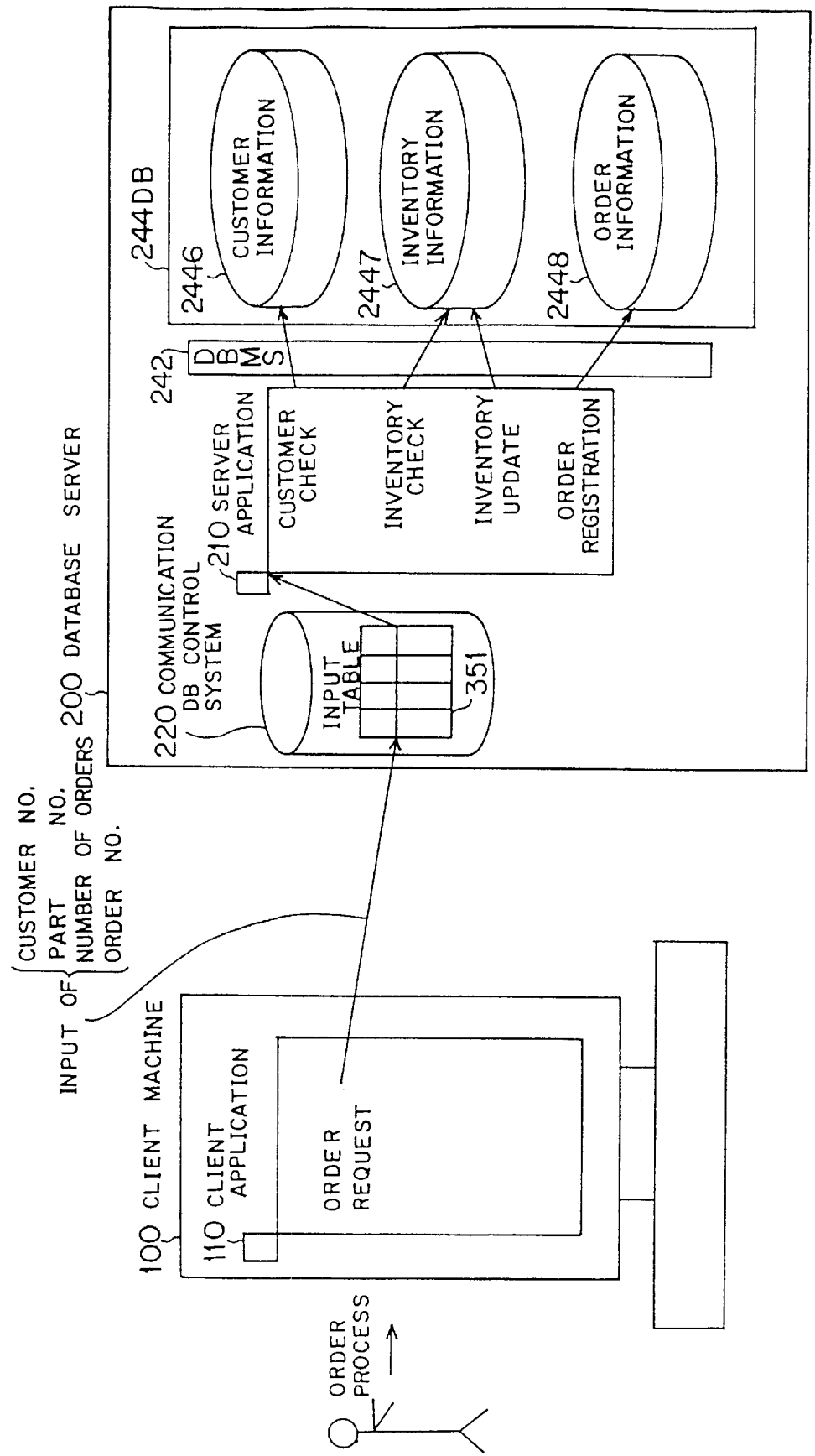
FIG. 15 is a schematic diagram for explaining an example of a collecting type job process.

The above-described process is an example of the reply type (real communication) data process. FIG. 15 is a schematic diagram showing a collecting type data process according to the embodiment that performs the order process that was performed by the client application 110 corresponding to the RDA.

In this case, data items ("customer number", "part number", "number of orders", and "order number") that are supplied from the client application 110 to the server application 210 are defined in the input table definition information 303I of the collecting type public service information 300. A process that receives data that is input by the user corresponding to a data item defined in the input table definition information 303I and that requests input data to be registered into the input table 351 of the communication DB control system 220 with the SQL statement (INSERT) is generated as the client application 110.

On the other hand, with the SQL statement(SELECT), the database (DB) 244 of the database system 240 (that has a customer information file 2446, an inventory information file 2447, and an order information file 2448) is accessed by receiving input data of the input table 351 through the client application 110. Thus, performed are the back end processes as a server application 210 such as customer check, inventory check, inventory update, order registration, and so forth.

Thus, when the client application 110 accesses the database server 200 one time (namely, sends the SQL statement (INSERT), which inputs the input data to the input table 351, to the database server 200), one order process is completed. Thus, the process is completed in a shorter time period than the conventional method. In addition, the traffic amount on the network is reduced and the communication cost is decreased.

In the delivering type (delayed communication), the client application 110 and the server application 210 can be independently generated corresponding to the content of the definition of the input table definition information 303I of the communication DB 221.

Since only the server application 210 accesses the database system 240, even if the construction of the database 244 of the database system 240 is changed, it is not necessary to correct the client application 110.

Figure 16:
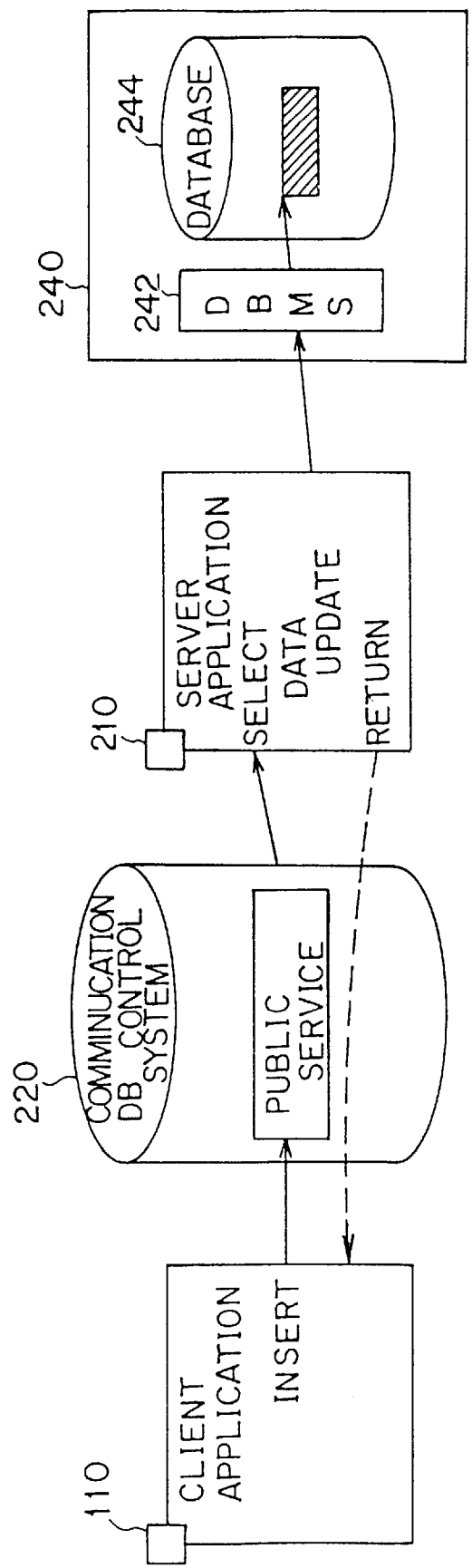
FIG. 16 is a schematic diagram for explaining updating of a database.

FIG. 16 shows an example of the process of the database generated according to the public service of the communications DB control unit 220. In FIG. 16, the client application 110 instructs the server application 210 to update the data in the database 244 and the server application 210 informs the client application of the completion of the data update.

Figure 1B:
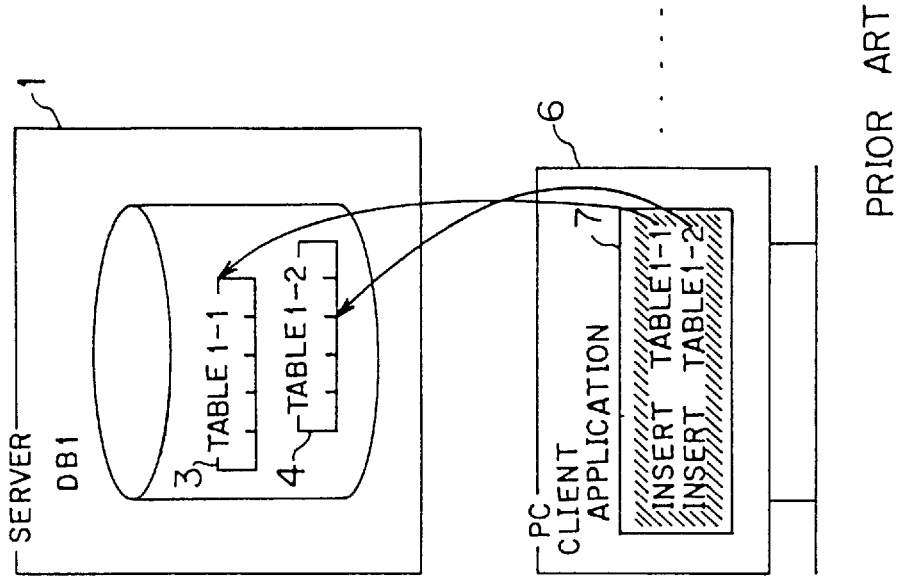
FIGS. 1A and 1B are schematic diagrams for explaining a problem of a conventional client/server database system that accesses a database corresponding to RDA (No. 1)
Figure 1A:
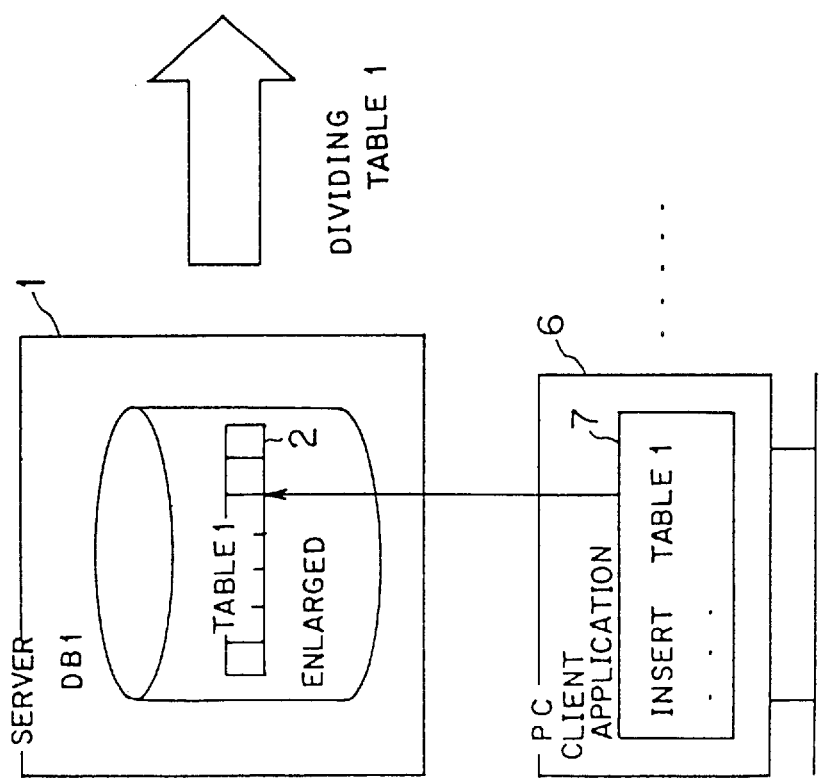
Figure 4:
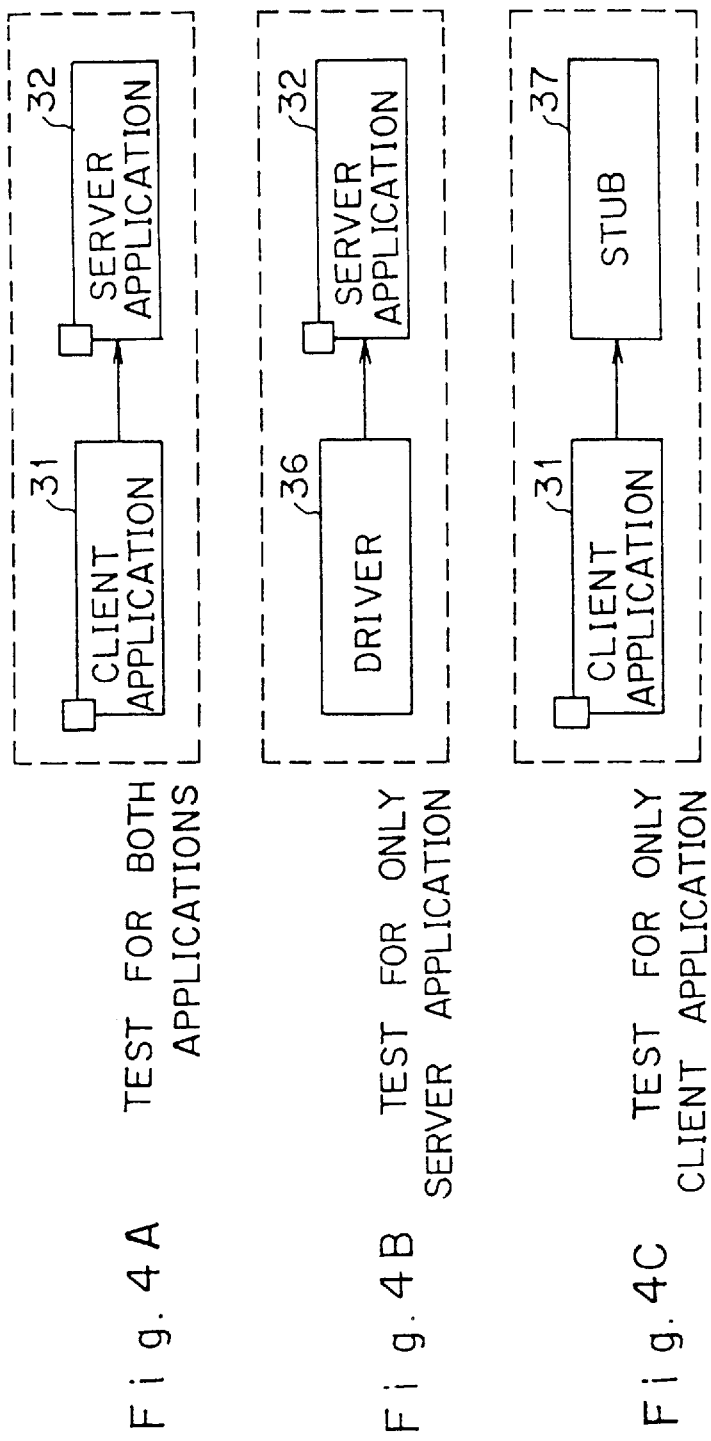
FIGS. 4A, 4B and 4C are schematic diagrams for explaining a problem in testing the operation of an application in a conventional C/S application type database system.
Figure 5:
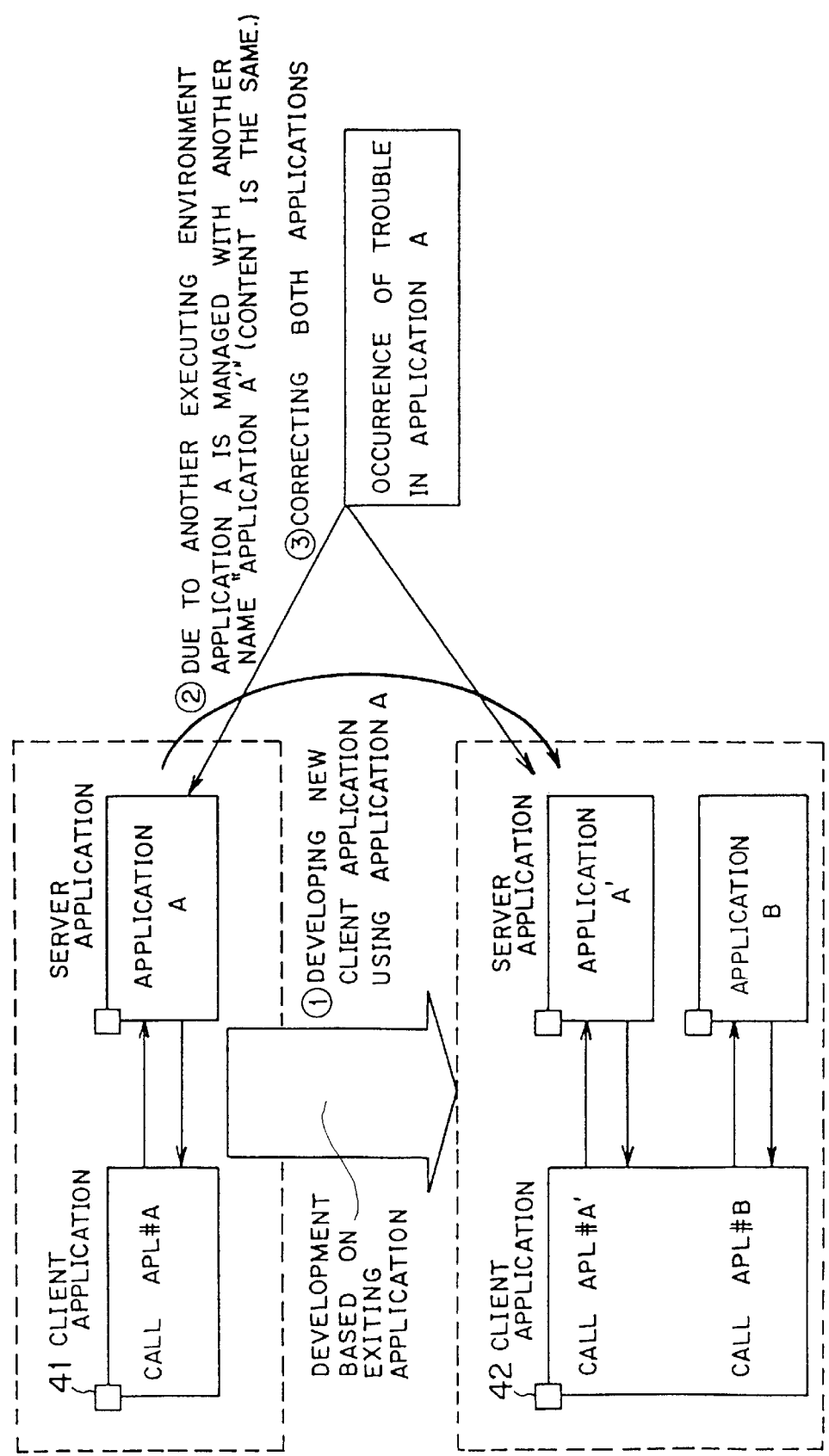
FIG. 5 is a schematic diagram for explaining a problem in developing a new job process using an existing server application in the conventional C/S application type database system.
Figure 17:
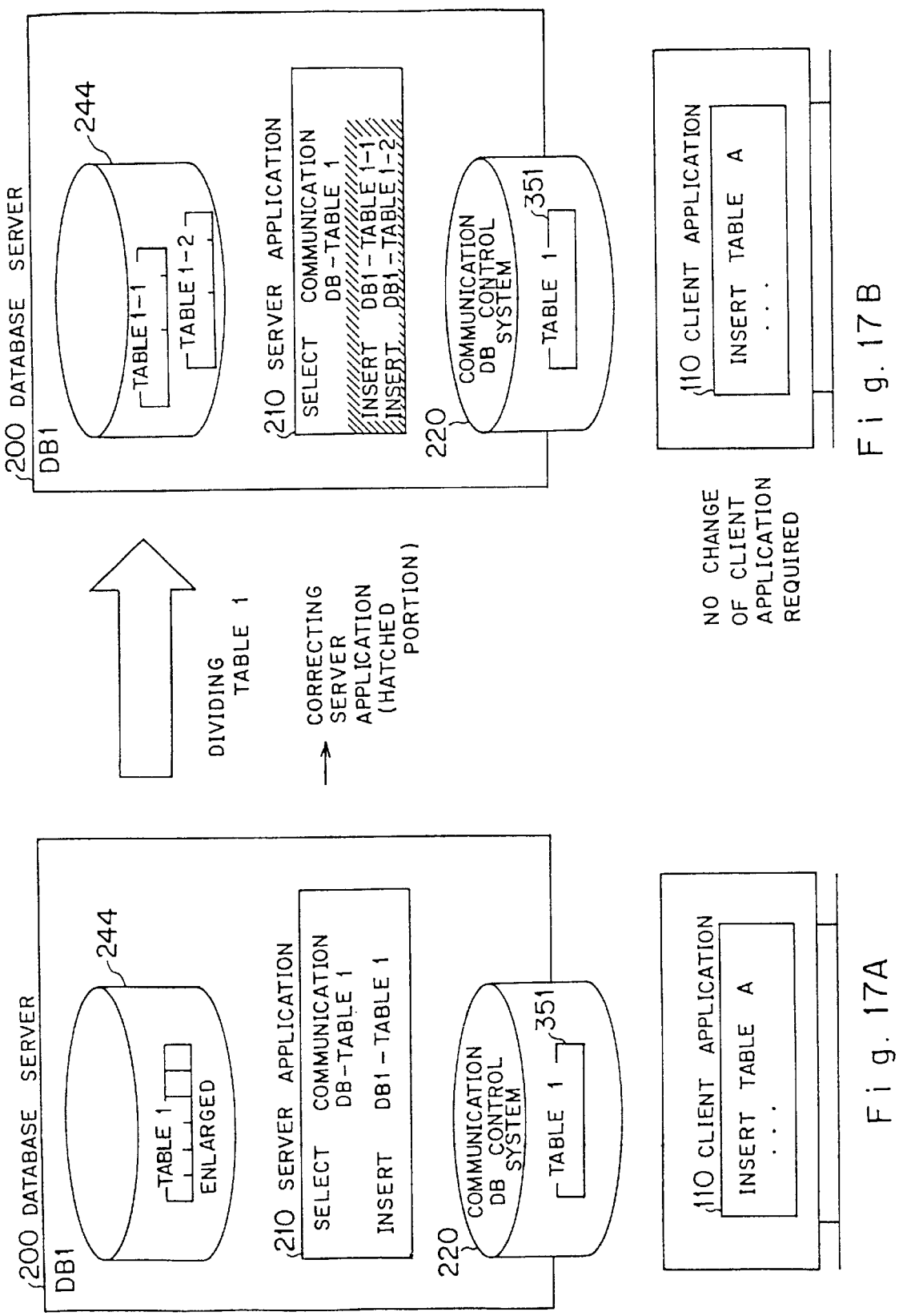
FIGS. 17A and 17B are schematic diagrams for explaining a method for changing a database construction on a database server.

FIGS. 17A and 17B are schematic diagrams showing a process in the case that even if the construction of the database 244 is changed, the correction of the client application 110 is not required. This process accords with the process shown in FIG. 1.

As shown in FIG. 17A, the server application 210 receives request data from the client application 110 through the input table 351 (communication DB-TABLE1) in the communication DB control system 220 and stores the request data in the TABLE1 (DB1-TABLE1) of the database 244 (DB1) of the database system 240.

In this case, the number of items of the DB1-TABLE1 increases and the access performance to the database DB1 deteriorates. As shown in FIG. 17B, in the database DB1, the DB1-TABLE1 is divided into two portions DB1-TABLE1-1 and DB1-TABLE1-2. In this case, only the server application 210 is corrected. In other words, one statement "INSERT DB1-TABLE1" in the server application 210 shown in FIG. 17A can be changed to "INSERT DB1-TABLE1-1" and "INSERT DB1-TABLE1-2" shown in FIG. 17B. This change does not affect the construction of the input table 351 (communication DB-TABLE1) of the communication DB control system 220. Thus, the change of the client application 110 is not required. Consequently, the manager of the database system 240 can change the structure of the database 244 without need to consider the client application 110.

Only the public service information 300 (service definition information 301, input table definition information 303I, and reply table definition information 303R) registered to the communication DB 221 is open to the user (the developer of the client application 110). The construction of the database 244 of the database system 240 of the database server 200 is not open to the user. Thus, the design and management of a table open to the user and the design and management of a table registered to the database 244 of the database system 240 can be separated. Thus, in designing a table of the database, the table of the communication DB 221 open to the user and the table of the database 244 of the database system 240 can be independently designed. Thus, the table designer (data provider) of the communication DB 221 can design and manage the table considering the operability for the user. The table designer (database manager) of the database 244 of the database system 240 can design and manage the table considering the accessibility and shared management of the database 244.

Figure 18:
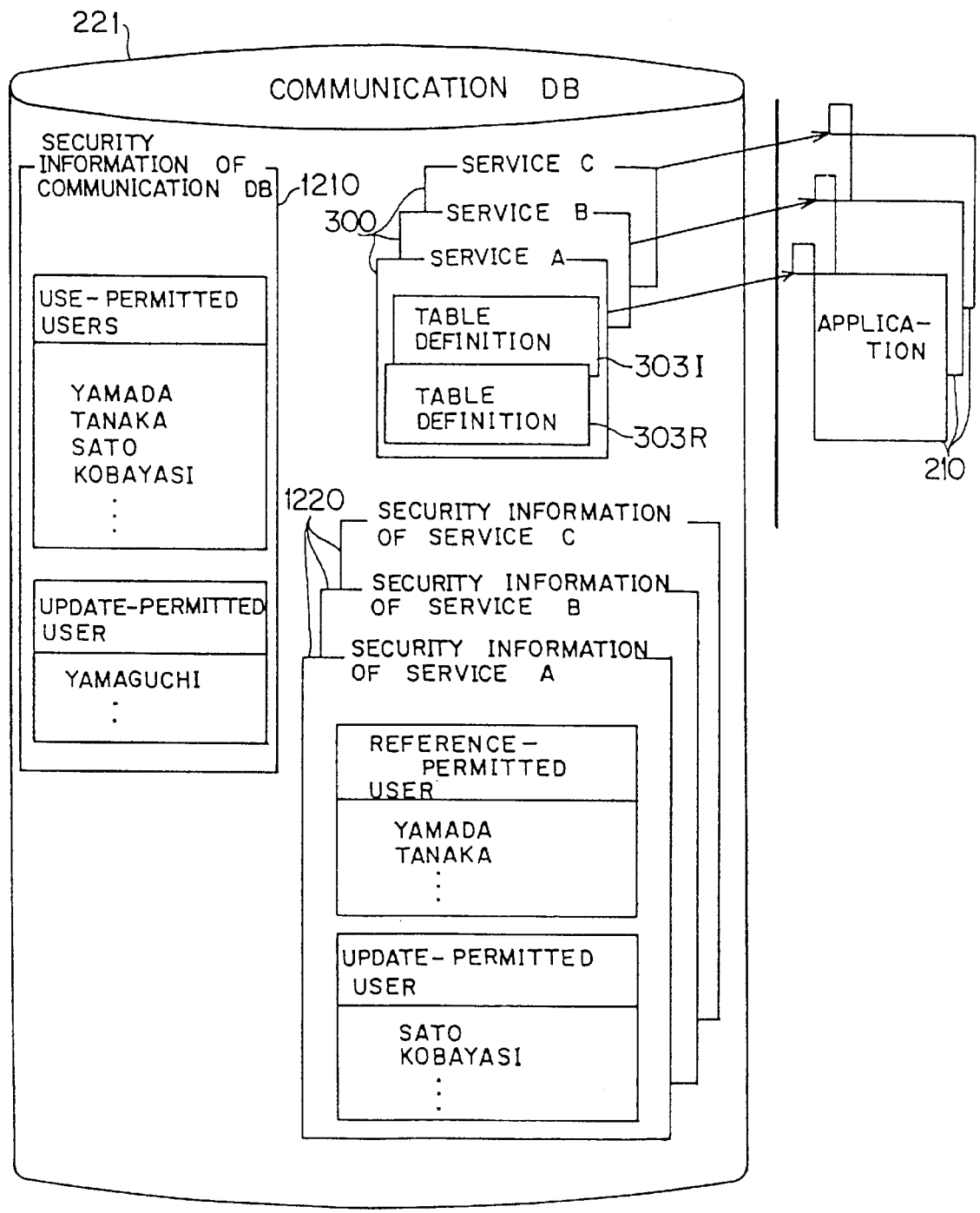
FIG. 18 is a block diagram for explaining security information that is set to a communication database.

FIG. 18 is a schematic diagram for explaining the content of security information registered in the communication DB 221.

In FIG. 18, a user who has been assigned a user right is referred to as a "user-permitted user" and a user who has been assigned an update right is referred to as "update-permitted user".

As the security information, there are security information 1210 for an access right to the communication DB 221 and security information 1220 for an access right to the public service information 300 (services A, B, and C shown in FIG. 18).

The security information 1210 for the communication DB 221 has two rights that are use right and update right. The user who has been assigned the use right can access the communication DB 221, but cannot update it. On the other hand, a user who has been assigned the update right can also update the communication DB 221.

When a connection request is issued to the communication DB 221, it is determined whether or not the user has the use right or update right. When the user does not have both the rights, he is prohibited from accessing the communication DB 221.

The security information of the public service information 300 (public service) has a reference right and an update right. A user who has been assigned the reference right can only access tables 351 to 353 corresponding to the public service information 300. Thus, the user cannot update the content of the public service information 300 (the service definition information 301 and the table definition information 303I and 303R). On the other hand, a user who has been assigned the update right can access, update, and delete the content of the public service information 300. In FIG. 18, a user who has been assigned the reference right is referred to as a "reference-permitted user" and a user who has been assigned the update right is referred to as a "update-permitted user".

The user who has been assigned the update right of the communication DB 221 can update and delete the public service information 300.

Next, the operation of the embodiment with the above-described construction will be described.

First, the operation for registering the service definition information 301 open to the client application 110 to the communication DB 221 will be described. This registration operation can be performed by a user who has been assigned the update right of the above-described public service information 300.

a) The user designs a table of the communication DB 221 on a GUI screen of a console 600 and requests the database server 200 to register the definition information of the table with the SQL statement.

When the communication procedure control portion 201 receives this request, it qualifies the user through the user qualifying portion 202. When the user qualifying portion 202 has qualified the user, it sends the SQL statement to the SQL analyzing control portion 222C.

b) The SQL analyzing control portion 222C analyzes the SQL statement and determines the registration right to the communication DB 221 through the resource use qualifying portion 224.

c) When the resource use qualifying portion 224 has qualified the registration right, the code converting/attribute converting portion 223C converts the code.

d) The communication DB service definition portion 231 registers the requested table definition information to the communication DB 221.

e) Upon the completion of the registration, the communication DB service definition portion 231 informs the SQL analyzing control portion 222C of the completion of the registration.

f) The SQL analyzing control portion 222C informs the client application 110 of the completion of the registration through the communication procedure control portion 201.

g) The console 500 displays the completion of the registration on the GUI screen.

Next, the method for the security control according to the embodiment will be described.

This security control is performed when a connection request is issued to the communication DB 221 or when the input table 351 and the reply table 352 in the communication DB 221 are accessed.

1. Security check when the connection request is issued to the communication DB 221

Figure 19:
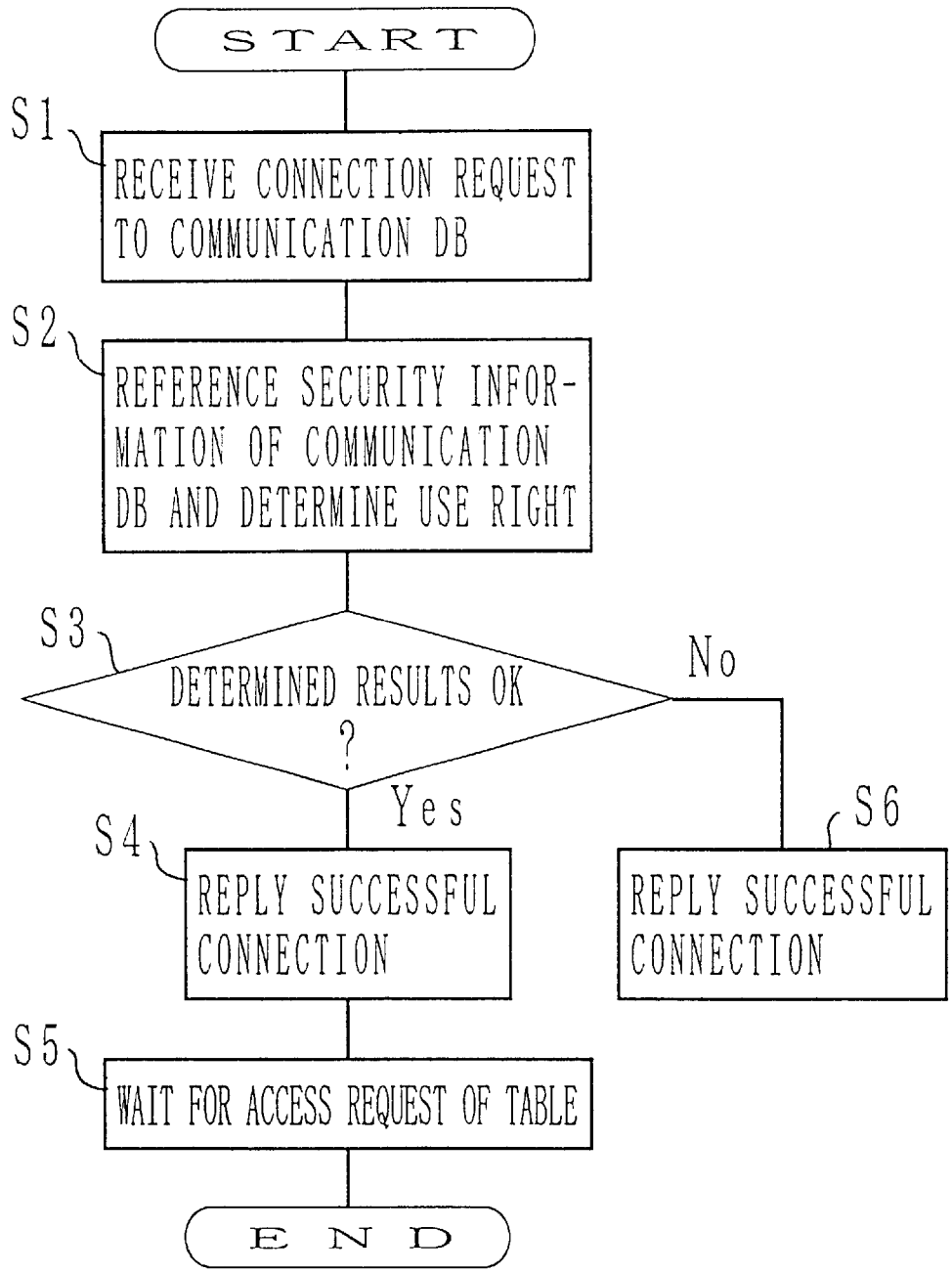
FIG. 19 is a flowchart for explaining a security check process in the case that a connection request to a communication database takes place.

This security check is performed by the communication procedure control portion 201 through the user qualifying portion 202. FIG. 19 is a flow chart for explaining this check process.

When the communication procedure control portion 201 receives a connection request from the client application 110 for the communication DB 221 through the network, the portion 201 sends a user identifier received along with the connection request to the user qualifying portion 202 and requests the user qualifying portion 202 to determine whether or not the executor of the client application 110 has the use right to the communication DB 221 (at step S1).

The user qualifying portion 202 references the security information 1210 (FIG. 18) of the communication DB 221 registered in the communication DB 221, determines whether or not the user has the use right of the communication DB 221, and sends the check result to the communication procedure control portion 201 (at step S2).

The communication procedure control portion 201 receives the determined result. When the communication procedure control portion 201 has determined that the user has the use right of the communication DB 221 (YES at step S3), it sends a reply message that represents that "the connection to the communication DB 221 is successful" to the client application 110 (at step S4) and waits for an access request to the table of the communication DB 221 from the client application 110 (at step S5).

When the user does not have the use right of the communication DB 221 (NO at step S3), the communication procedure control portion 201 sends a reply message that represents that "the connection to the communication DB 221 is unsuccessful" to the client application 110 (at step S6).

2. Security check when the table access request is received.

This security check process is performed by the SQL analyzing control portion 222C of the communication DB control system 220 through the resource use qualifying portion 224.

Figure 20:
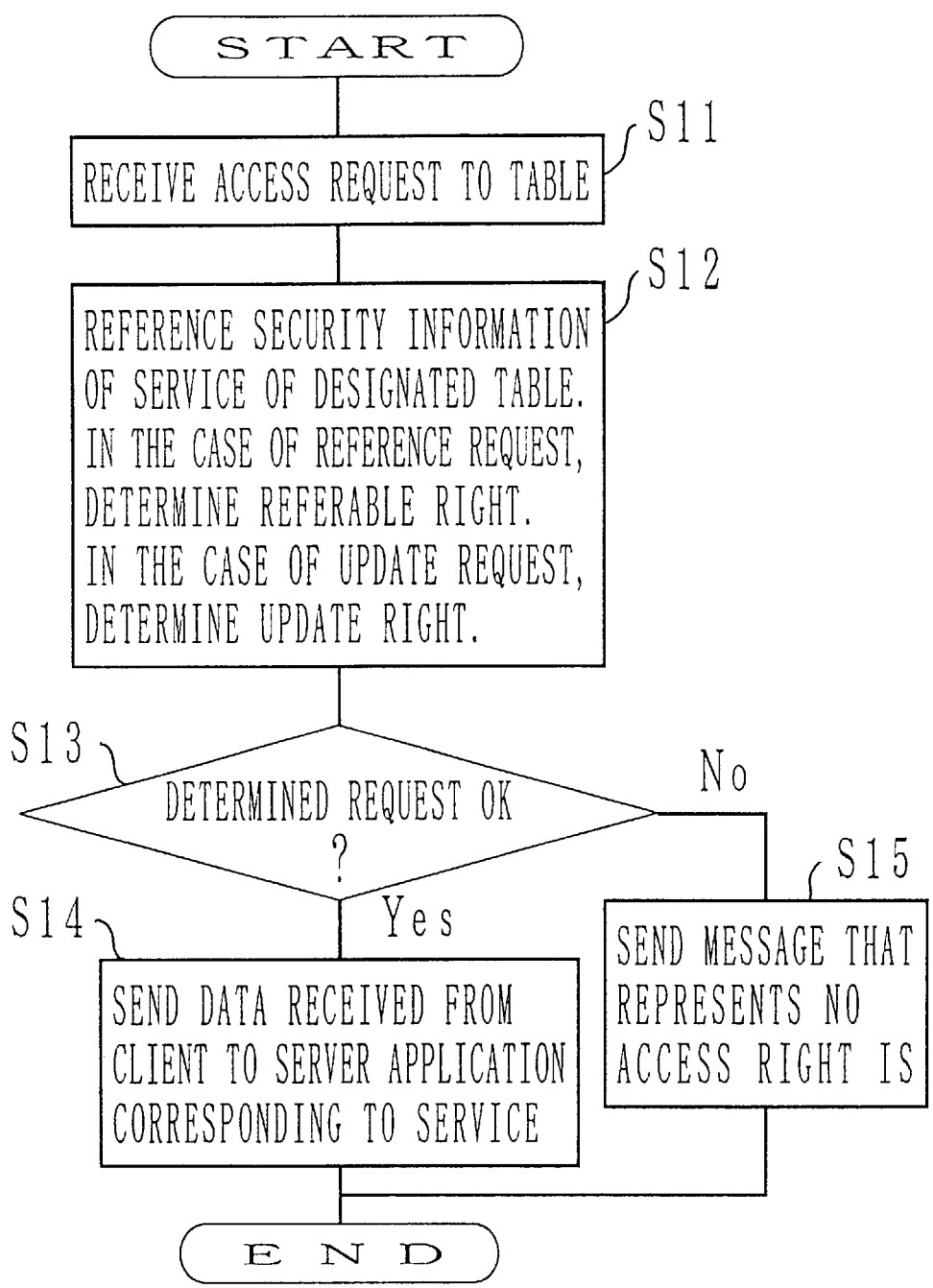
FIG. 20 is a schematic diagram for explaining a security check process in the case that an access request to a table defined by the communication DB takes place.

FIG. 20 is a flow chart for explaining this check process.

When the SQL analyzing control portion 222C receives an SQL statement that represents a table access request from the communication procedure control portion 201, the portion 222C sends the designated table name and the user identifier of the accessing client to the resource use qualifying portion 224 and requests the resource use qualifying portion 224 to determine whether or not the client has the access right to the designated table (at step S11).

The resource use qualifying portion 224 references security information 1220 of the public service included in the designated table of the communication DB 221 and determines whether or not the client has the access right to the designated table corresponding to the user identifier. There are two access types that are "reference" and "update". When a "reference request" is issued, the reference right information registered in the security information 1220 is determined. When an "update request" is issued, the update right information registered in the security information 1220 is determined. The resource use qualifying portion 224 sends the determined result to the SQL analyzing control portion 222C (at step S12).

The SQL analyzing control portion 222C determines whether or not the access of the client to the designated table is valid (YES at step S13), the portion 222C requests the message queue control portion 225 to register (queue) the message data to the designated table so as to send the message data of the client to the server application 210 corresponding to the public service (at step S14).

When the SQL analyzing control portion 222C has determined that the client does not have a valid access right to the designated table (NO at step S13), the portion 222C informs the client (client application 110) of a reply message that represents "no access right" through the communication procedure control portion 201 (at step S15).

In this embodiment, even if a client accesses the database 244 (referred to as the DB 244) of the database system 240 for a large amount of data, it does not adversely affect the reply to other clients.

The communication DB control system 220 is disposed between the client application 110 and the server application 210. The data storing process (communication DB storing process) by the client application 110 into the communication DB 221 is performed independently of the access (real DB access process) to the real DB 244 by the server application 210 using the stored data by the queue control system in the communication DB control system 220. These processes are asynchronously performed.

Figure 21:
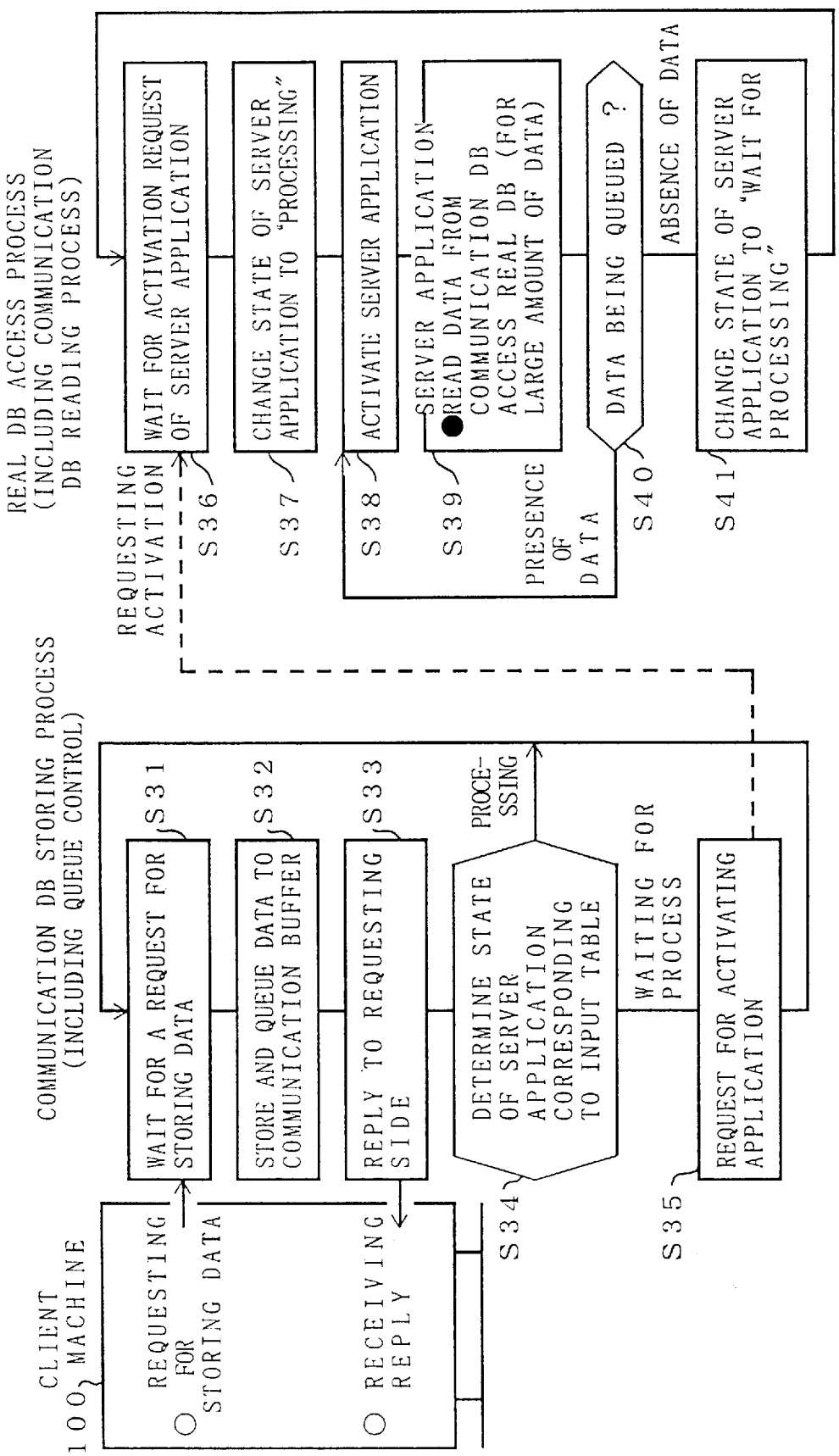
FIG. 21 is a flowchart for explaining a communication database access process and a real database access process.

Next, with reference to a flow chart of FIG. 21, such processes will be described.

While the communication DB control system 220 is waiting for a request for storing data to the input table 351 of the public service of the message queue control portion 225 in the communication DB control system 220, when the client application 110 issues such a request (INSERT) to the input table 351 (at step S31), the message queue control portion 225 queues the data to the input table 351. In other words, the data is stored in a communication buffer 226 formed in the memory and linked to the queue of the input table 351 (at step S32).

After the queuing process has been completed, the message queue control portion 225 informs the requesting client application 110 of a reply message that represents that the storage request to the communication DB 221 has been completed (at step S33).

The message queue control portion 225 determines the present state of the server application 210 that processes the data queued in the input table 351. While the server application 210 is processing the data, the flow returns to step S31. At step S31, the message queue control portion 225 waits until the client application 110 issues a data storing request ("processing" at step S34) On the other hand, while the server application 210 is waiting for a process ("waiting for process" at step S34), the message queue control portion 225 requests the application execution control portion 241 to activate the server application 210 through the application activation request control portion 229 (at step S35).

Thus, the application execution control portion 241 changes the state of the server application 210 from "waiting for activation request" (at step S36) to "processing" (at step S37) and then executes the server application 210 (at step S38).

The server application 210 retrieves data from the communication DB 221 (namely, the input table 351) stored by the client application 110, accesses the real DB 244 corresponding to the data, and performs a predetermined data process (at step S39).

When the process of the server application 210 is completed, the application execution control portion 241 determines whether or not data to be sent to the server application 210 has been stored (queued) in the input table 351. When the data has been stored ("presence of data", at step S40), the flow returns to step S38. At step S38, the server application 210 is activated. Thus, the steps S38 and S39 are repeated until no data is stored in the input table 351.

When no data is stored in the input table 351 ("absence of data", at step S40), the application execution control portion 241 changes the state of the server application 210 to "waiting for process" (at step S41). Thus, the server application 210 waits for an activation request (at step S36).

Corresponding to the data storing request from the client application 110 to the communication DB 221, when the data has been queued to the input table 351 of the public service, the communication DB control system 220 informs the client application 110 of the completion of the data storing request. Thus, the client application 110 can always have a quick reply to an access to the communication DB 221. In addition, the communication DB control system 220 can receive accesses from many client applications to the communication DB 221 in a short time.

Figure 22:
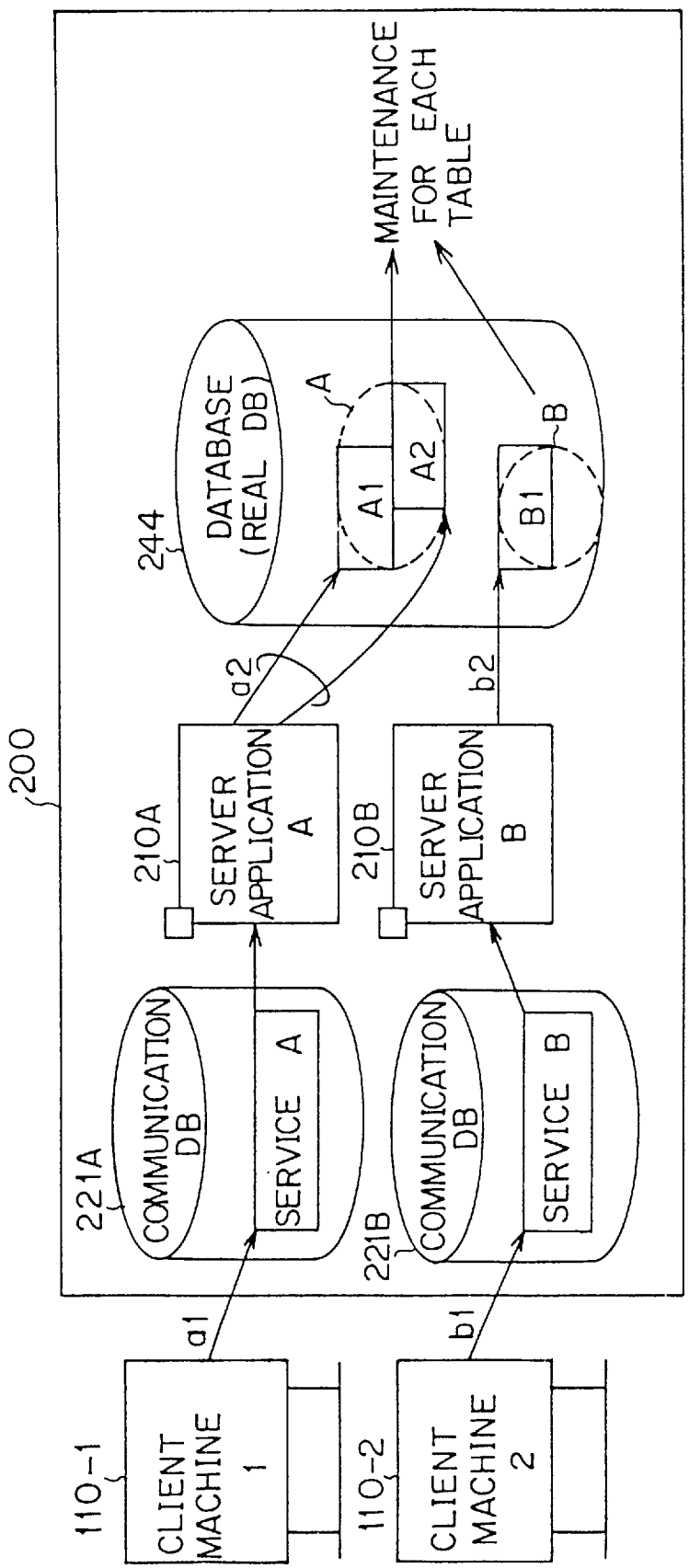
FIG. 22 is a schematic diagram for explaining a method for an overload control.

FIG. 22 is a schematic diagram for explaining a managing method performed by a manager for an access time zone, an overload control of the database server 200, and a priority control for each job.

In FIG. 22, two client machines 110-1 and 110-2 are connected to the database server 200. In the database server 200, two communication DBs 221A and 221B are constructed. In the communication DBs 221A and 221B, public services A and B are registered, respectively. Server applications 210A and 210B are stored corresponding to the public services A and B, respectively.

The database (real DB) 244 of the database system 240 in the database server 200 registers a table group A (tables A1 and A2) and a table group B (table B1). The server application 210A accesses the table group A of the real DB 244 (this access is referred to as access a2). The server application 210B accesses the table group B of the real DB 244 (this access is referred to as access b2). The access of the public service A of the communication DB 221A from the client machine 110-1 is referred to as access a1. The access of the public service B of the communication DB 221B from the client machine 110-2 is referred to as b1.

1. Operation and management of access time zone

For example, when only the table group A in the real DB 244 should be maintained, the manager suppresses the access a1 of the client machine 110-1 to the communication DB 221A and the access a2 of the server application 210 to the real DB 244. In this case, it is not necessary to suppress an access to the table group B of the real DB 244 (namely, the access b1 of the client machine 110-2 to the communication DB 221B and the access b2 of the server application 210B to the real DB 244). In other words, the table group A can be maintained without need to suspend the process for the table group B.

The access a1 is suppressed by a service close function of the communication DB 221A. On the other hand, the access a2 is suppressed by stopping the executing environment of the server application 210A. When only the access a2 is suppressed, for the client machine 110-1, the real DB 244 can be maintained without need to stop the access a1 to the communication DB 221A (namely, the public service A). This is because a request by the access a1 is queued to the input table 351 corresponding to the public service A of the communication DB 221A.

In this embodiment, since the communication DB 221 is provided, the stop range of the system can be localized.

2. Overload control

The priorities of the public services can be designated. When the load of the database server 200 increases, the access to the public services with lower priorities are stopped.

In the example shown in FIG. 22, when the priority of the public service A is lower than that of the public service B, the access a1 from the client machine 110-1 to the public service A of the communication DB 221-A or the access a2 of the server application 210A to the table group A of the real DB 244 is suppressed. In other words, the process of the server application 210A is stopped. Thus, the load of the database server 200 is reduced.

In this case, the access a1 and the access a2 are suppressed in the same manner as the control of the above described access time zone. In this case, when only the access a2 is suppressed, the load can be suppressed without need to stop the service of the client machine 110-1. This process is effective when the load of the server application 210A is high.

3. Priority control

In the priority control, the priorities for the public services are designated. The operations of job process with lower priorities are temporarily stopped. A job process with a higher priority is superior to other jobs with lower priorities.

For example, in the example shown in FIG. 22, when the priority of the public service A is lower than that of the public service B, the access a1 or the access a2 is suppressed so as to stop the process of the server application 210A. Thus, the process performance of the server application 210B is improved. Consequently, the public service B to the client machine 110-1 is superior to the other services. In other words, the public service B is executed with a higher priority over other services.

In this case, the access a1 and the access a2 can be suppressed in the same manner as the above-described access time zone and overload control. In this case, when only the access a2 is suppressed, the public service to the client machine 110-1 can be protected from being stopped.

Figure 23:
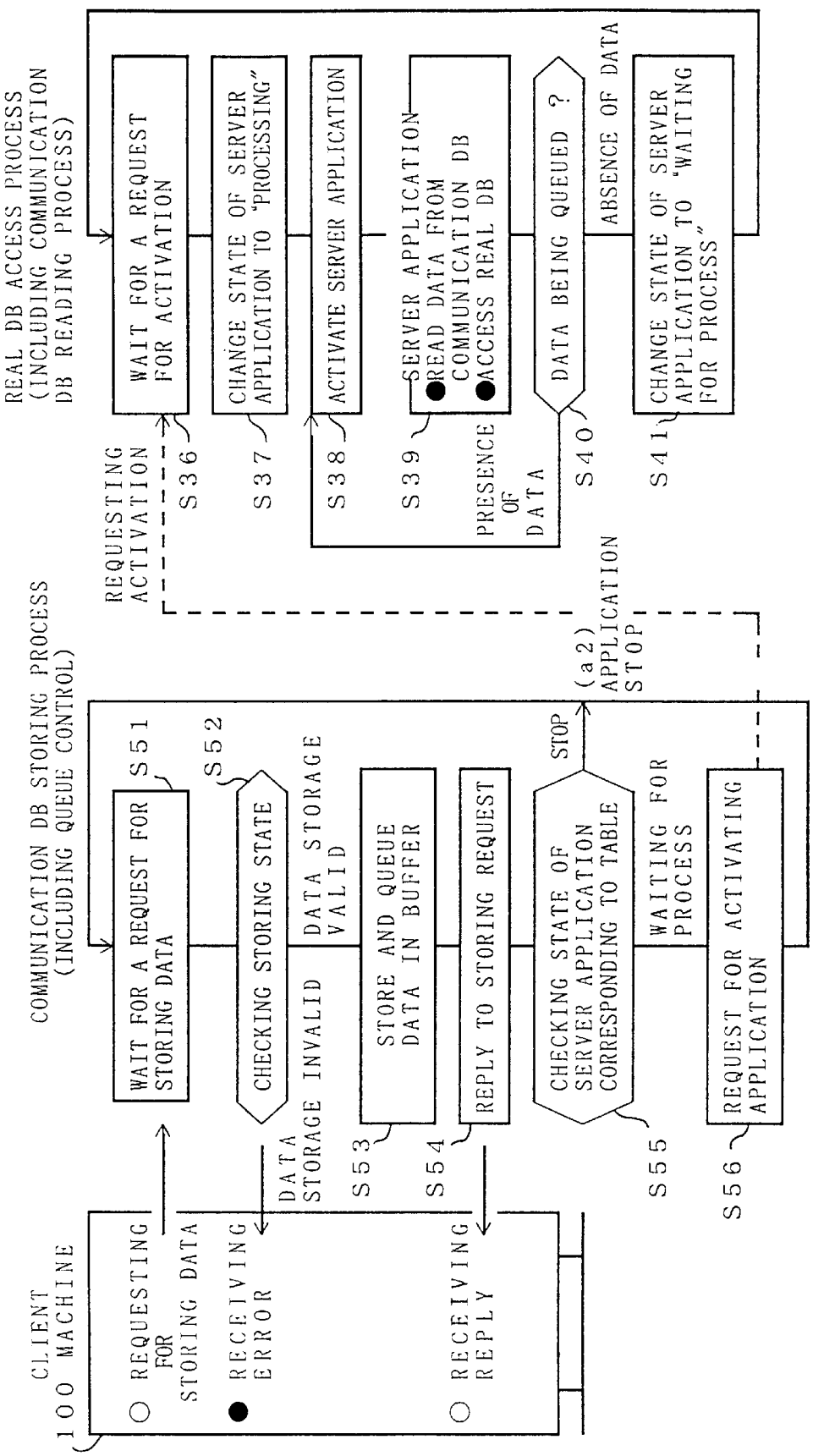
FIG. 23 is a flowchart for explaining an operation of a communication DB control system that accomplishes an access time zone control, an overload control, and a priority control.

FIG. 23 is a flow chart for explaining the operation of the communication DB control system 220 that accomplishes the above-described time zone control, overload control, and priority control.

In this case, the service close function of the communication DB 221 prohibits data from being stored in the input table 351 corresponding to the public service. The stop of the executing environment of the server application 210 represents that the server application 210 stops.

In FIG. 23, when the message queue control portion 225 receives a data storing request from the client application 110 (at step S51), the message queue control portion 225 determines the present storing service state of the input table 351 (at step S52). When the storing service is closed, the message queue control portion 225 informs the client application 110 of an error message that represents "data storage unsuccessful" through the communication procedure control portion 201 ("data storage invalid", at step S52).

In other words, in the case shown in FIG. 22, the access a1 to the public service A from the client machine 110-1 is suppressed.

On the other hand, unless the storing service is closed at the step S52 ("data storage valid", at step 85 S52), the required stored data is queued in the input table 351 (at step S53). When the data has been queued, the message queue control portion 225 informs the client application 110 of a reply message that represents that data storing request has been completed (at step S54).

Thereafter, the message queue control portion 225 determines the state of the server application 210 corresponding to the input table 351 (at step S55). When the server application 210 stops, the flow returns to step S51. At the step S51, the message queue control portion 225 waits for the next data storing request.

In other words, while the executing environment of the server application 210 stops, the access of the server application 210 to the real DB 244 corresponding to a service request from the client application 110 is stopped.

On the other hand, when the server application 210 is waiting for a process at the step S55, the message queue control portion 225 requests the application execution control portion 241 to activate the server application 210 through the application activation request control portion 229 (at step S56).

After the activation request has been issued, in the same manner as the process shown in FIG. 22, the server application 210 is executed.

As shown in FIG. 8, in this embodiment, the communication DB control system 220 contains two code converting/attribute changing portions 223C and 223S. In the communication DB 221, input tables 351 and 353 and a reply table 352 that are used to exchange a message (data) between the client application 110 and the server application 210 are generated. The formats (attributes) of the items of data stored in these tables that function as queues are defined as item attributes in table definition information 303 (input table definition information 303I and reply table definition information 303R) registered in the communication DB 221.

Figure 24:
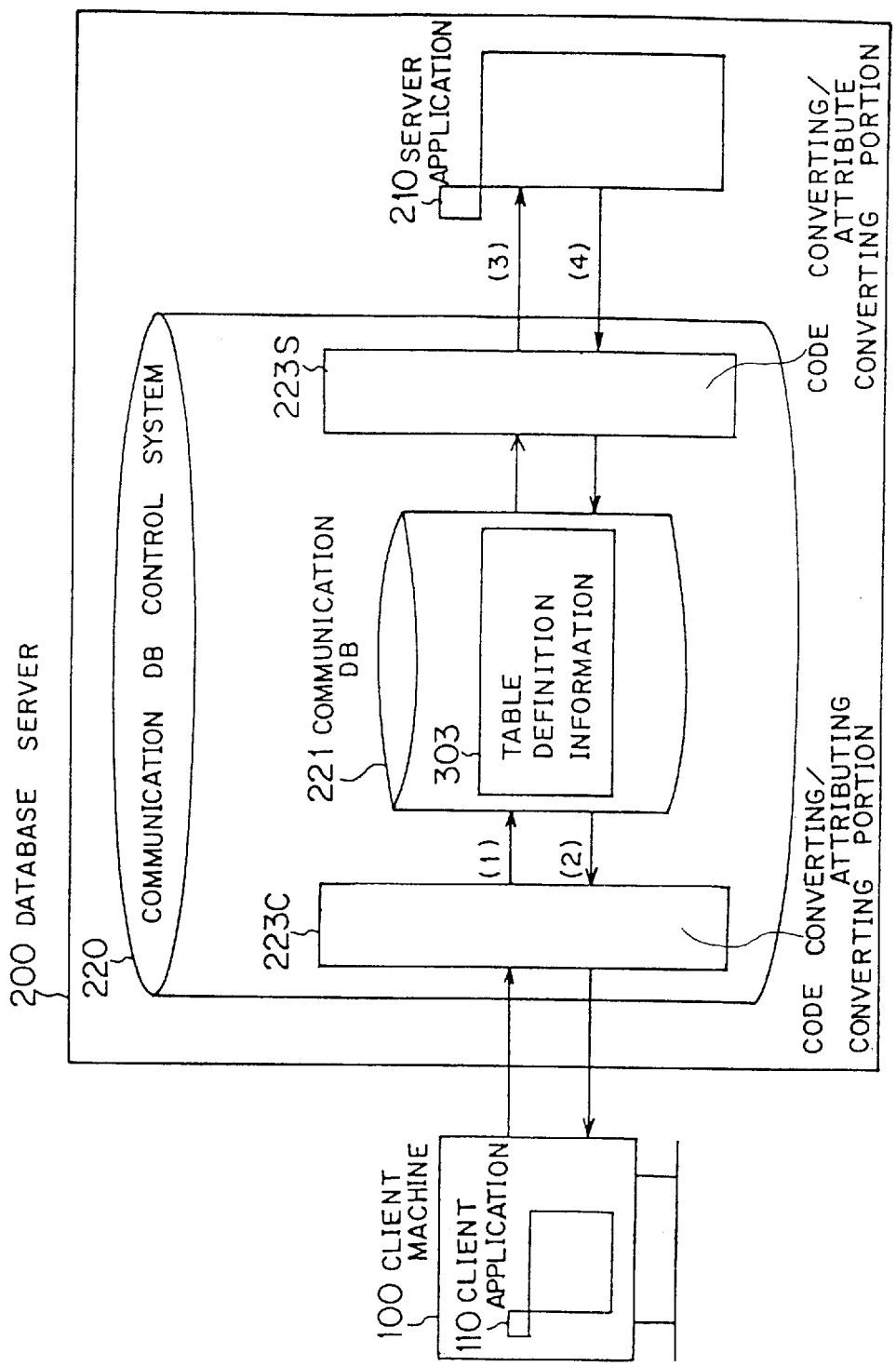
FIG. 24 is a schematic diagram showing an item attribute converting system.

FIG. 24 is a schematic diagram showing an item attribute converting system for data exchanged between the client application 110 and the server application 210 according to the embodiment.

The code converting/attribute converting portion 223C performs the following attribute converting process for each item of data that the client application 110 sends and receives.

(1) When data is stored in the communication DB 221:
Each item of data received from the client application 110 is converted into an attribute defined by table definition information and then output.

(2) When data is retrieved from the communication DB 221:
Each item of data (stored in the reply table 352 or the input table 353) stored in the communication DB 221 by the server application 210 is converted into an item attribute required by the client application 110 and then output.

On the other hand, the code converting/attribute converting portion 223S performs the following item attribute converting process for each item of data that the server application 210 sends and receives.

(3) When data is retrieved from the communication DB 221:
An attribute of each item of data retrieved from the communication DB 221 (input table 351) is converted into an attribute requested by the server application 210 and then output.

(4) When data is stored in the communication DB 221:
An attribute of each item of data received from the server application 210 is converted into an attribute defined by the table definition information 303 of the communication DB 221.

Next, with reference to flow charts of FIGS. 25 to 28, the above-described attribute converting processes (1) to (4) will be described one after the other.

Figure 25:
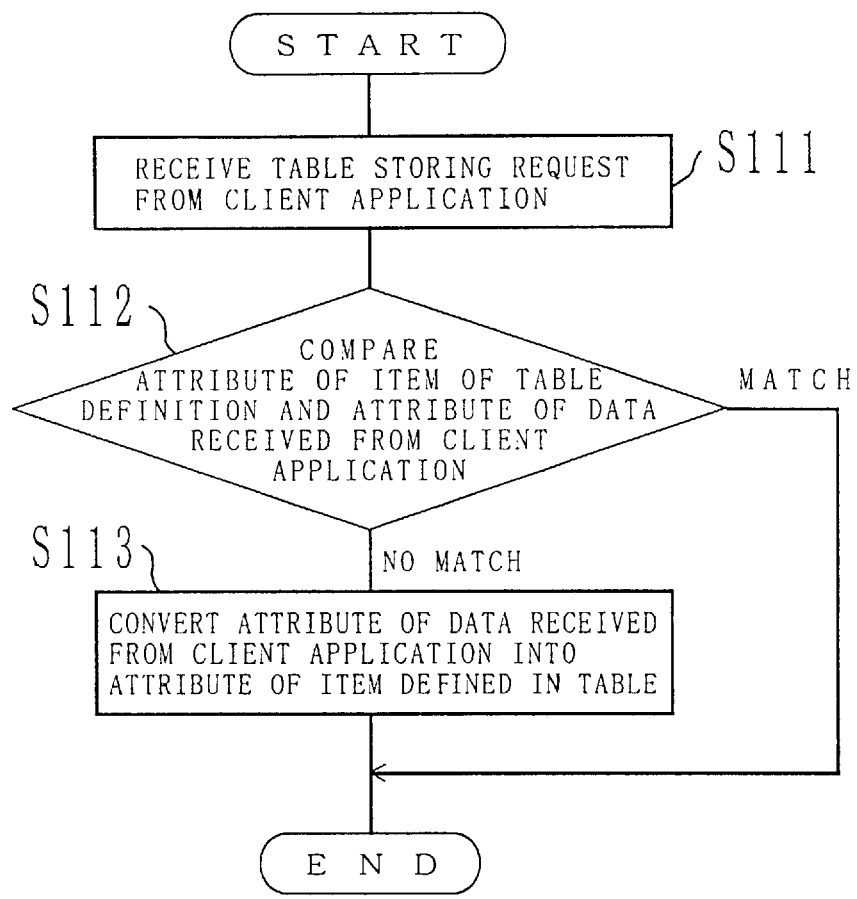
FIG. 25 is a flowchart for explaining an item attribute converting process in the case that a table storing request is received from a client application.

FIG. 25 is a flow chart for explaining the attribute converting process (1) that the code converting/attribute converting portion 223C executes.

When the code converting/attribute converting portion 223C receives data stored in the communication DB 221 (input table 351) requested by the client application 110 from the SQL analyzing control portion 222C (at step S111), the portion 223C compares the item attribute information defined in the definition information 303I of the input table 351 of the communication DB 221 and the attribute of each item of the received data (at step S112). When there is an item in which attributes do not match ("no match", at step S112), the code converting/attribute converting portion 223C converts the attribute of the item into an attribute defined in the input table definition information 303I (at step S113).

At step S112, when the attributes of all the items of the received data accord with the attributes defined in the input table definition information 303I ("match", at step S112), the attributes of the received data are not converted.

Figure 26:
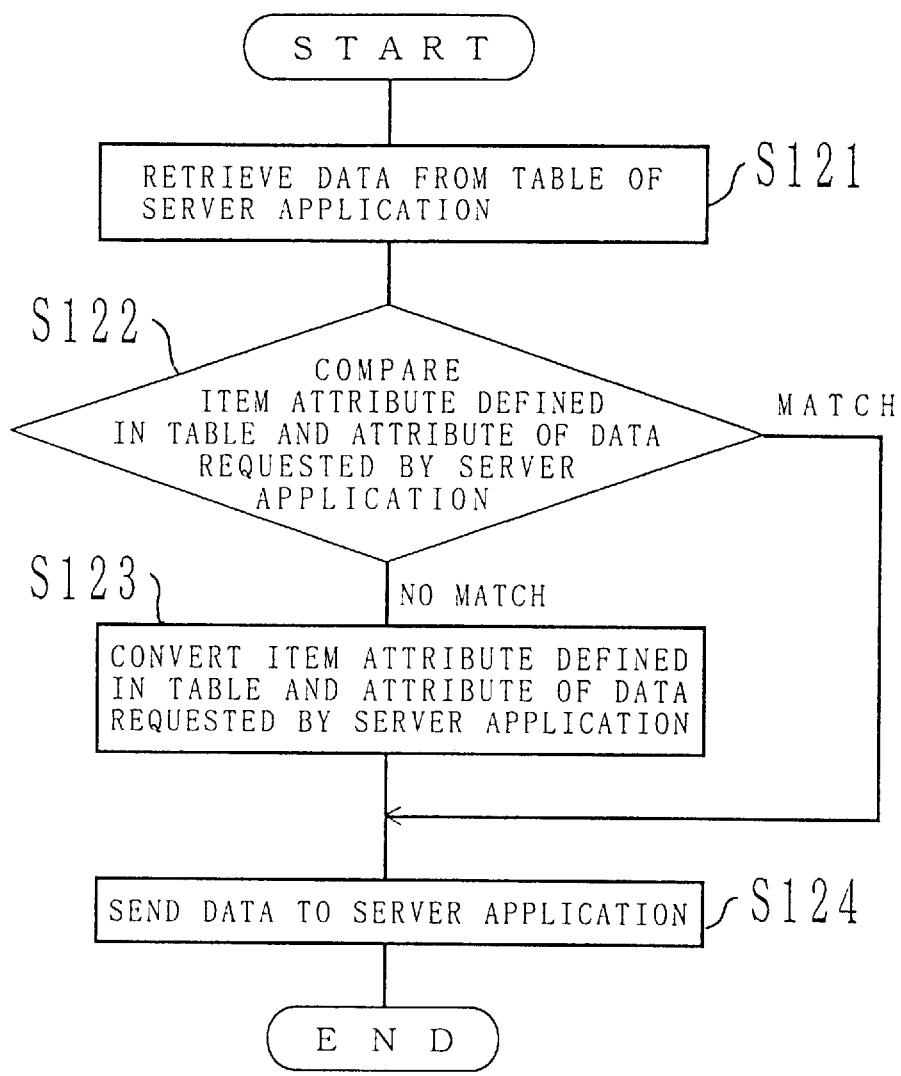
FIG. 26 is a flowchart for explaining the item attribute converting process in the case that a server application issues a request for extracting data queued in a table.

FIG. 26 is a flow chart for explaining the attribute converting process (3) that the code converting portion 223S executes.

When data that is stored in the input table 351 by the client application 110 and that is sent to the server application 210 is retrieved from the input table 351 (at step S121), the code converting/attribute converting portion 223S references the definition information 303I of the input table 351 and compares an attribute of each item of the retrieved data and an attribute requested by the server application 210 (at step S122).

When there is an item in which an attribute defined in the table do not match an attribute requested by the server application 210 ("no match", at step S122), the code converting/attribute converting portion 223S converts the attribute into the attribute requested by the server application 210 (at step S123).

Thereafter, the converted data is sent to the server application 210 (at step S124). On the other hand, when the attributes of all the items retrieved at step S122 match the attributes requested by the server application 210 ("match", at step S122), step S124 is immediately executed.

When the client application 110 sends data to the server application 210 corresponding to the attribute converting process shown in FIGS. 25 and 26, the applications 110 and 210 process data with their proper attributes.

Figure 27:
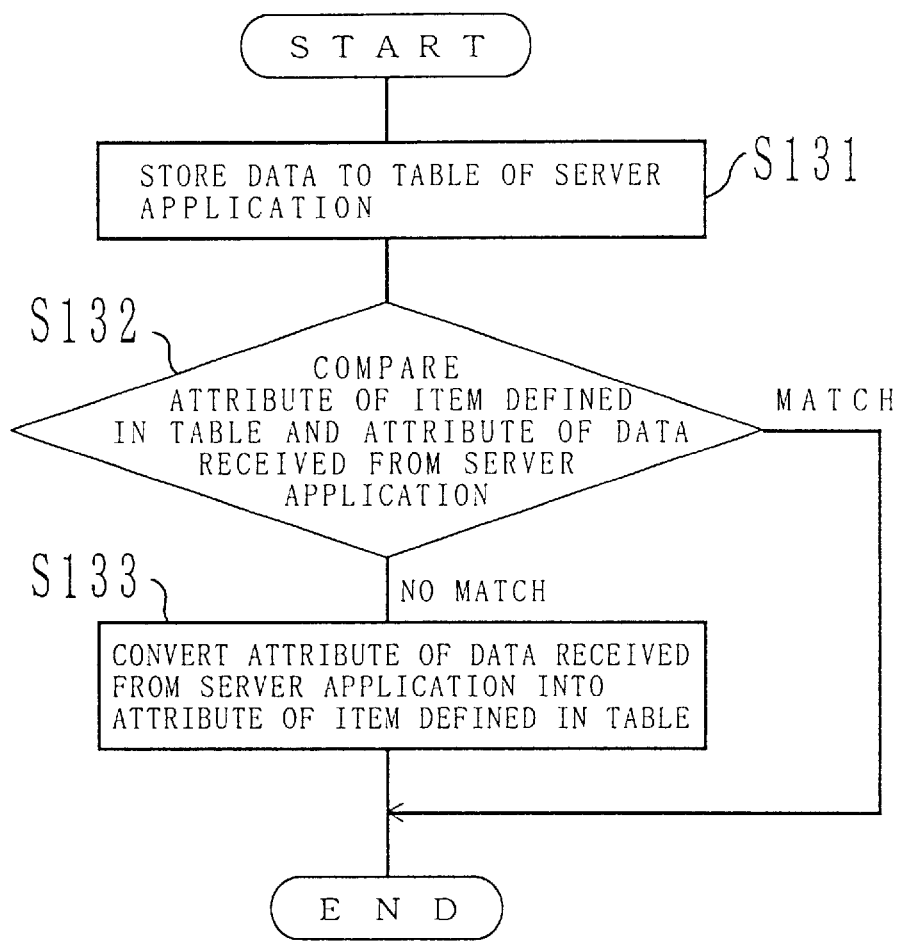
FIG. 27 is a flowchart for explaining the item attribute converting process in the case that a request for storing data to a table is received from a server application.

FIG. 27 is a flow chart for explaining the attribute converting process (4) that the code converting/attribute converting portion 223S executes.

When the code converting/attribute converting portion 223S receives data stored in the communication DB 221 (the reply table 352 or the input table 353) requested by the server application 210 with the SQL statement (INSERT) (at step S131), the portion 223S references the definition information 303R or 303I of the table 352 or 353 registered in the communication DB 221 and determines whether attributes of all items received match attributes defined in the definition information 303R or 303I (at step S132).

When there an item whose attributes do not match ("no match", at step S132), the code converting/attribute converting portion 223S converts the attribute of the item into the attribute defined by the definition information 303R or 303I (at S133).

When the attributes of all the items of the received data at step S132 match the attributes defined in the table definition information 303R or 303I ("match", at step S132), the attributes of the items of the received data are not converted.

Figure 28:
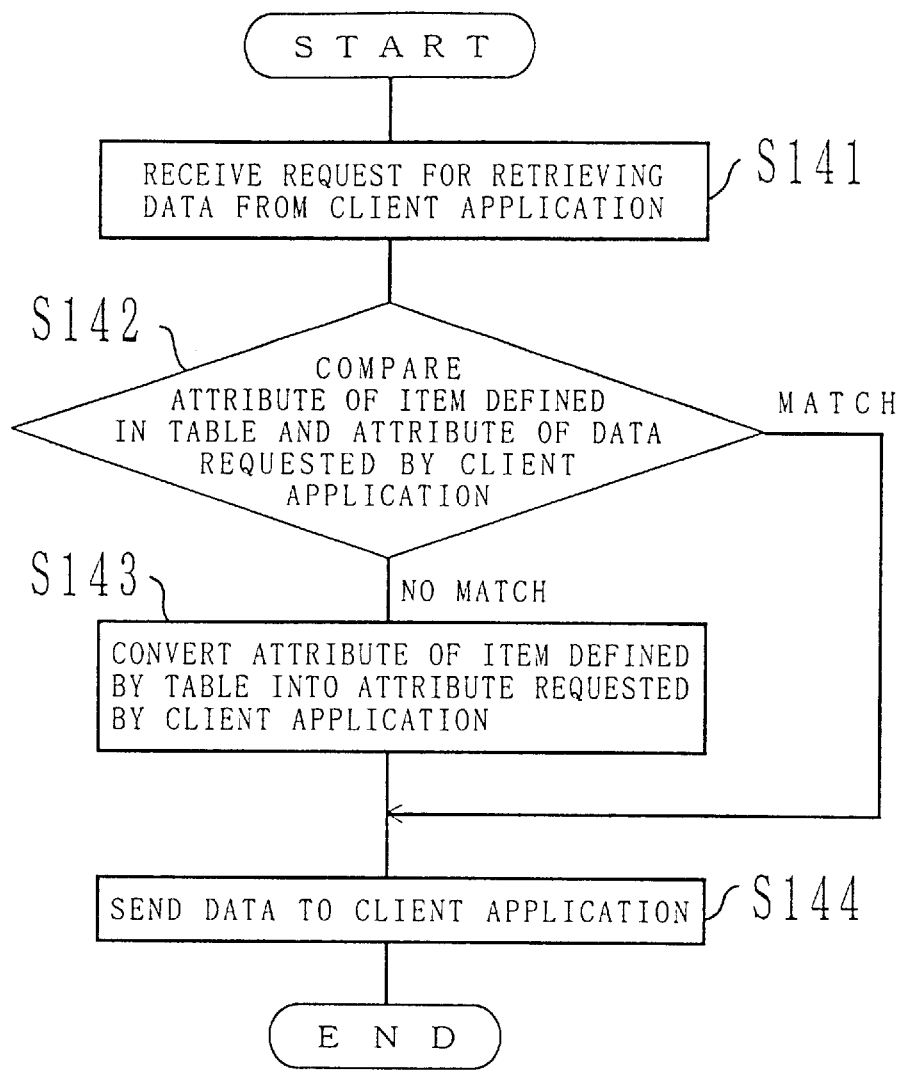
FIG. 28 is a flowchart for explaining an operation in the case that a request for extracting data queued in a table is received from a client application.

FIG. 28 is a flow chart for explaining the item attribute converting process (2) that the code converting/attribute converting portion 223C executes.

When data to be sent to the client application (data supplied from the server application 210) is retrieved from the communication DB 221 (reply table 352 or input table 353) (at step S141), the code converting/attribute converting portion 223C references the definition information (303R or 303I) of the reply table 352 or input table 353 and determines whether or not attributes of all items of the retrieved data match attributes requested by the client application 110 (at step S142).

When there is an item whose attributes do not match ("no match", at step S142), the code converting/attribute converting portion 223C converts the item into an attribute requested by the client application 110 (at step S143). The converted data is sent to the client application 110 through the communication procedure control portion 201 (at step S144).

When the attributes of all the items of the data retrieved at the step S142 match the attributes requested by the client application 110 ("match", at step S142), the step S144 is immediately executed.

When data is sent from the server application 210 to the client application 110 corresponding to the item attribute converting processes shown in FIGS. 27 and 28, the applications 210 and 110 can process data with their proper attributes.

In this embodiment, attributes of data items to be exchanged between the client application 110 and the server application 210 are not defined. Thus, when numeric values are exchanged, even if attributes of an application of the client machine 100 do not match those of the database server 200, the numeric values can be exchanged. For example, data can be exchanged between a server application 210 using the DECIMAL attribute as a numeric attribute and a client application 110 with the INTEGER attribute as a numeral attribute.

Thus, the client application 110 and the server application 210 can designate attributes of items of data corresponding to their process types.

Figure 29:
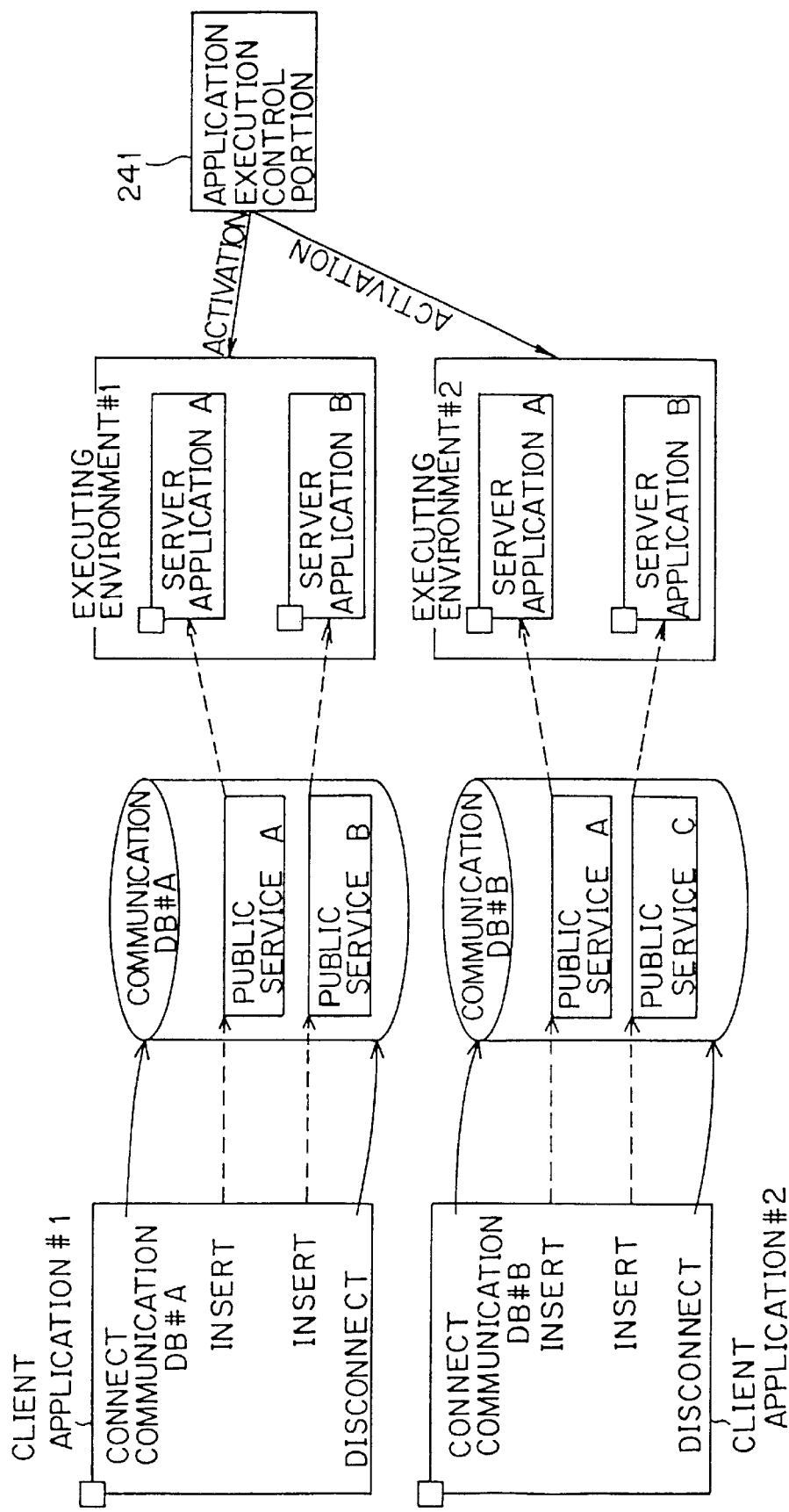
FIG. 29 is a schematic diagram for explaining a method for constructing the relation of a client and a server in a new executing environment.

FIG. 29 is a schematic diagram for explaining a method for allowing the server application A that operates in an executing environment #1 to operate in a new executing environment #2 without changing the server application name so as to construct a new job process.

In this embodiment, the executing environment is present for each communication DB 221. This is because the service definition information 301 of the communication DB 221 correlates the public services with the server application 210 that executes the data process thereof. When the client application 110 uses (accesses) the communication DB 221, to start it, a CONNECT command is declared. To stop it, a DISCONNECT command is declared. When the CONNECT command is issued, the communication DB 221 is allocated the client application 110.

Thus, according to this embodiment, the same server application 210 can be operated in a plurality of executing environments. In other words, the same server application 210 with the same name can be registered to the public service information 301 of a plurality of communication DBs 221.

Thus, as shown in FIG. 29, in the different executing environments #1 and #2, the server application 210 can be operated with the same name. In other words, when a new job process is constructed with the server application A, the same name can be used without need to change the name of the server application A.

Figure 30:
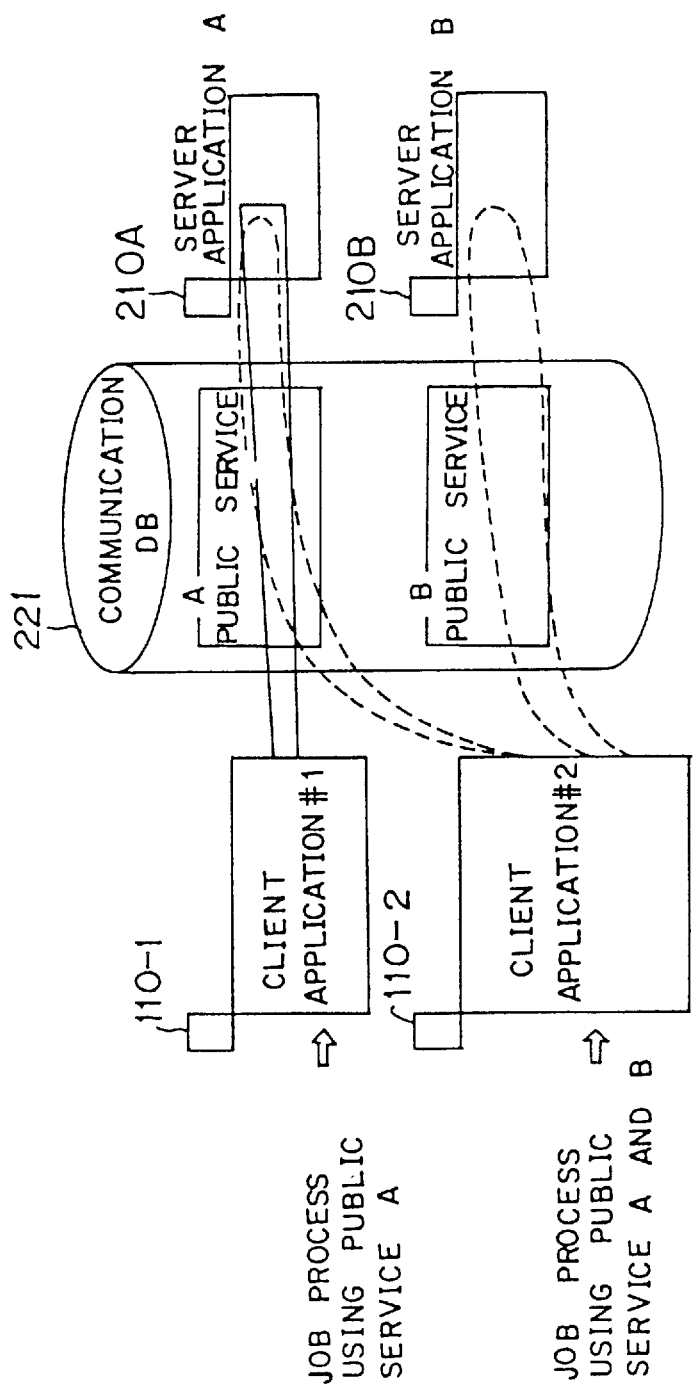
FIG. 30 is a schematic diagram showing another example of the server application.

FIG. 30 is a schematic diagram showing a process of which a client application 110-1 (#1) performs a job using the public service A and a client application 110-2 (#2) performs a job using the public services A and B. In this case, the client application 110-1 (#1) and the client application 1102 (#2) can communicate with the server application A.

In this embodiment, the communication DB control system 220 can independently perform the operation tests of the client application 110 and the server application 210.

In other words, the communication DB control system 220 is operated as an alternative of a driver for the server application 210. In addition, the communication DB control system 220 is operated as an alternative of a stub.

Operation test of client application 110

(1) The client application 110 writes data to the input table 351 of the communication DB control system 220 corresponding to an SQL programming (INSERT).

(2) After the client application 110 has written the data to the input table 351, the application 110 determines the content thereof.

Operation test of server application 210

(1) Data is pre-registered to the input table 351 of the communication DB control system 200.

(2) The server application 210 sends the SQL command (SELECT) to the communication DB control system 200, retrieves the data from the input table 351, and determines the data thereof.

In this embodiment, since the communication DB control system 200 is accessed in the same method as the issuance of a conventional SQL programming, commercially available spreadsheet software and database access (database access) software can be used as a client application 110.

As described above, according to the present invention, the following effects can be obtained.

The client application and the server application can exchange data (messages) by storing and retrieving data to and from a table with a format defined corresponding to public service information (this table is referred to as a public table). Thus, the client application and the server application can be independently developed by considering only the public service information.

Thus, for example, when records of the public table comprise items included in each record of one or a plurality of tables of one or a plurality of databases (referred to as real databases) on the database server, the following effects can be obtained.

The client application can be generated by considering only an access to the public table rather than the format of a table formed in the real database (this table is referred to as a real table). The server application accesses the database corresponding to the data retrieved from the public table.

Thus, the construction of the databases can be changed by correcting only the server application rather than the client application.

Thus, the manager of the database can change the construction of the real database without considering the client application.

The public table open to the user and the real table in the real database managed by the manager can be independently designed. Thus, both the tables can be designed in the optimal formats for the user and the manager. In addition, since various tables can be designed by different designers, the load of table design can be reduced. In addition, since the table information can be individually maintained by the table designers, the management thereof can be shared.

An access right for each public table can be designated each user. In other words, since the database access of the user is performed for each public table, the manager can only designate the user the access right for each public table. An access right of each job manager to the real database of the database server can be designated and managed independently from an access right for each user.

Since the server application can access a plurality of real tables in the real database with one public table of the client application, the traffic amount on the network between the client application and the server application can be reduced and the job process can be performed at high speed.

Since the database server manager can control the suspension of the public service and the server application, operation rules such as the access time control, overload control, and priority control for each job process can be designated by the manager at his will. Thus, it is not necessary to cause the users to follow the operation rules.

Since the functional logic for the data process type such as real communication/delayed communication is omitted from the application (client application and server application) side, the interface between the client application and the server application is only the data format. Thus, both the applications can be independently constructed. Thus, the productivity of both the applications is improved.

Since the data attribute converting process logic is omitted from both the client application and the server application, the productivity of both the applications is improved.

When the present invention is used for an alternative of a driver for the server application and for an alternative of a stub for the client application, their operation tests can be independently performed without need to provide both the applications.

In addition, commercial application packages such as existing spreadsheet software and database access software can be easily used as a client application.

Moreover, since a server application can be operated in a new executing environment without need to change the name, when the server application is used for a new job process, it can be easily constructed and the server application can be easily corrected.

What is claimed is:

1. A communication control apparatus provided between a client application and a server application and controlling transmission of data between the client application and the server application in a client/server system, said apparatus comprising:

a first database storing published service information being published for a client and storing according to the published service information data transmitted between the client application and the server application, said published service information comprising information defining a format of stored data; and control means for controlling data communications between the client application and the server application by temporarily storing in said first database the data received from one of the client application and the server application, wherein an interface to the first database available to the client application is independent of an interface between the first database and the server application, and wherein the client application retrieves the published service information from the first database.

2. The communication control apparatus according to claim 1, wherein:

said published service information further comprises process forms of the data communications provided for the client.

3. The communication control apparatus according to claim 2, wherein said published service information comprises defined importance levels.

4. The communication control apparatus according to claim 2, further comprising:

entry means for entering the published service information in said first database.

5. A communication control apparatus provided between a client application and a server application and controlling transmission of data between the client application and the server application in a client/server system, said apparatus comprising:

a first database storing published service information being published for a client and storing according to the published service information data transmitted between the client application and the server application;

client request analyzing means for analyzing a request received from the client application and storing data specified by a write request in said first database; and server request analyzing means for analyzing a request received from the server application, reading data specified by a read request from said first database, and transmitting the data to the server application, wherein an interface to the first database available to the client application is independent of an interface between the first database and the server application, and wherein the client application retrieves the published service information from the first database.

6. A communication control apparatus for controlling transmission of data between a client application and a server application in a client/server system, comprising:

a first database used in data communications between the client application and the server application;

client request analyzing means for analyzing a request received from the client application and storing data specified by a write request in said first database;

server request analyzing means for analyzing a request received from the server application, reading data specified by a read request from said first database, and transmitting the data to the server application;

first entry means for entering in said first database first security information about a client authorized to access said first database; and first security check means for referring to the first security information when a request for connection to said first database is made from a client through the client application, and for determining whether the request of the client to access said first database is accepted.

7. The communication control apparatus according to claim 5, further comprising in said first database:

first entry means for entering the published service information defining information about said first database published to clients.

8. The communication control apparatus according to claim 7, wherein said first database comprises an entry table in which data is written during a write request from the client application and whose format is defined according to the published service information.

9. A communication control apparatus for controlling transmission of data between a client application and a server application in a client/server system, comprising:

a first database used in data communications between the client application and the server application, said first data base comprising:

first entry means for entering published service information defining information about said first database published to clients, and an entry table in which data is written at a write request from the client application and whose format is defined according to the published service information;

client request analyzing means for analyzing a request received from the client application and storing data specified by a write request in said first database;

server request analyzing means for analyzing a request received from the server application, reading data specified by a read request from said first database, and transmitting the data to the server application;

second entry means for entering in said first database second security information about a client authorized to access said entry table; and second security check means for referring to the second security information when a request for connection to said entry table is made from a client through the client application, and for determining whether the request of the client to access said entry table is accepted.

10. The communication control apparatus according to claim 8, wherein said entry table refers to a queue.

11. The communication control apparatus according to claim 10, wherein said client request analyzing means comprises first queue control means for storing data received from the client application queue in said entry table.

12. A communication control apparatus for controlling transmission of data between a client application and a server application in a client/server system, comprising:

a first database used in data communications between the client application and the server application, said first data base comprising:

first entry means for entering published service information defining information about said first database published to clients, and an entry table in which data is written at a write request from the client application and whose format is defined according to the published service information, said entry table referring to a queue;

client request analyzing means for analyzing a request received from the client application and storing data specified by a write request in said first database, said client request analyzing means comprising first queue control means for having data received from the client application queue in said entry table; and server request analyzing means for analyzing a request received from the server application, reading data specified by a read request from said first database, and transmitting the data to the server application, wherein said first queue control means prevents data requested by the client application from being queued on said entry table when a block instruction is issued for a service provided according to the published service information in which the format of said entry table is defined.

13. A communication control apparatus for controlling transmission of data between a client application and a server application in a client/server system, comprising:

a first database used in data communications between the client application and the server application, said first data base comprising:

first entry means for entering published service information defining information about said first database published to clients, and an entry table in which data is written at a write request from the client application and whose format is defined according to the published service information, said entry table referring to a queue;

client request analyzing means for analyzing a request received from the client application and storing data specified by a write request in said first database, said client request analyzing means comprising first queue control means for having data received from the client application queue in said entry table; and server request analyzing means for analyzing a request received from the server application, reading data specified by a read request from said first database, and transmitting the data to the server application, wherein said client request analyzing means further comprises notifying means for notifying the client application of completion of a process requested by the client application when the data received from the client application are completely queued on said entry table by said first queue control means.

14. The communication control apparatus according to claim 8, wherein said server request analyzing means comprises:

activating means for activating the server application when said entry table stores the data; and data transmitting means for retrieving the data addressed to the server application from said entry table according to a request for the server application activated by said activating means, and for transmitting the data to the server application.

15. The communication control apparatus according to claim 14, wherein said activating means stops activation of the server application when the server application is in a stop state.

16. The communication control apparatus to claim 8, further comprising:

first attribute converting means for converting an attribute of each item of the data received by said client request analyzing means into an attribute defined by the published service information, wherein said client request analyzing means stores, in said entry table, the data whose attribute is converted by said first attribute converting means.

17. The communication control apparatus to claim 8, further comprising:

second attribute converting means for converting an attribute of each item retrieved from said entry table by said server request analyzing means into an appropriate attribute for a process performed by the server application by referring to attribute information about each item of the data defined by the published service information, wherein said server request analyzing means transmits the data whose attribute is converted by said second attribute converting means to the server application.

18. The communication control apparatus to claim 8, wherein said server application accesses a second database; and a record on said entry table comprises at least one item belonging to each record on at least one table in said second database.

19. The communication control apparatus to claim 8, wherein a line on said entry table comprises at least one of each record belonging to a plurality of distributed second databases.

20. The communication control apparatus to claim 8, wherein said first database comprises a response table to which response data addressed to the client application is written during a write request of the server application and in which a format is defined according to the published service information.

21. The communication control apparatus to claim 20, wherein said response table refers to a queue.

22. The communication control apparatus according to claim 21, wherein said server request analyzing means comprises second queue control means for queuing data received from the server application on said response table.

23. The communication control apparatus to claim 20, further comprising:

second attribute converting means for converting an attribute of each item of the data received by said server request analyzing means into an attribute defined by the published service information, wherein said server request analyzing means stores, in said response table, the data whose attribute is converted by said second attribute converting means.

24. The communication control apparatus to claim 23, further comprising:

third attribute converting means for converting an attribute of each item of the data retrieved from said response table into an appropriate attribute for a process performed by the client application by referring to attribute information of each item of the data defined by the published service information, wherein said client request analyzing means transmits the data whose attribute is converted by said third attribute converting means to the client application.

25. A communication control apparatus provided between a client application and a server application and controlling transmission of data between the client application and the server application in a client/server system, comprising:

a first database storing published service information published for a client and storing according to the published service information data transmitted between the client application and the server application;

server request analyzing means for analyzing a request received from the server application and storing data specified by a write request in said first database; and client request analyzing means for analyzing a request received from the client application, reading data specified by a read request from said first database, and transmitting the data to the client application, wherein an interface to the first database available to the client application is independent of an interface between the first database and the server application, and wherein the client application retrieves the published service information from the first database.

26. The communication control apparatus to claim 25, further comprising in said first database means:

first entry means for entering the published service information defining information about said first database published to clients.

27. The communication control apparatus to claim 24, wherein said first database comprises an entry table in which the data is written during a write request from the server application and whose format is defined according to the published service information.

28. The communication control apparatus according to claim 27, wherein said entry table refers to a queue.

29. The communication control apparatus to claim 28, wherein said server request analyzing means comprises first queue control means for storing the data received from the server application queue in said entry table.

30. The communication control apparatus to claim 29, further comprising:

first attribute converting means for converting an attribute of each item of the data received by said server request analyzing means into an attribute defined by the published service information, wherein said server request analyzing means stores, in said entry table, the data whose attribute is converted by said first attribute converting means.

31. The communication control apparatus to claim 30, further comprising:

second attribute converting means for converting an attribute of each item of the data received by said entry table by said client request analyzing means into an appropriate attribute for a process performed by the client application by referring to an attribute information about each item of the data defined by the published service information, wherein said client request analyzing means transmits the data whose attribute is converted by said second attribute converting means to the client application.

32. A communication control apparatus for controlling transmission of data between a client application and a server application in a client/server system, comprising:

a first database used in data communications between the client application and the server application;

server request analyzing means for analyzing a request received from the server application and storing data specified by a write request in said first database; and client request analyzing means for analyzing a request received from the client application, reading data specified by a read request from said first database, and transmitting the data to the client application, wherein said server application accesses a second database; and a record on one table in said first table comprises at least one item belonging to each record on at least one table in said second database.

33. A client/server system comprising a client application and a server application which performs a job in cooperation with the client application, said apparatus comprising:

a database storing published service information being published for a client and storing according to the published service information data transmitted between the client application and the server application;

client request analyzing means for receiving data addressed from the client application to the server application and for entering the data in said database; and server request analyzing means for retrieving from the database the data addressed to the server application and transmitting the data to the server application, wherein an interface to the database available to the client application is independent of an interface between the database and the server application, and wherein the client application retrieves the published service information from the database.

34. The client/server system according to claim 33, wherein said database comprises the published service information indicating services published to clients and defining a format of a table of the services.

35. The client/server system according to claim 34, wherein said server application provides a published service for each of the services published to the clients and entered in said database.

36. A client/server system comprising a client application and a server application which accesses a first database in cooperation with the client application, comprising:

a second database storing published service information published for a client and storing according to the published service information data transmitted between the client application and the server application;

client request analyzing means for receiving data addressed from the client application to the server application and for entering the data in said second database; and server request analyzing means for retrieving from the second database the data addressed to the server application and transmitting the data to the server application, wherein said server application accesses the first database based on data received from said server request analyzing means, wherein an interface to the second database available to the client application is independent of an interface between the second database and the server application, and wherein the client application retrieves the published service information from the second database.

37. A client/server system comprising a client application and a server application which accesses a first database in cooperation with the client application, comprising:

a second database storing data transmitted between the client application and the server application;

client request analyzing means for receiving data addressed from the client application to the server application and entering the data in said second database; and server request analyzing means for retrieving from the database the data addressed to the server application and transmitting the data to the server application, wherein said server application accesses the first database based on data received from said server request analyzing means, and wherein an item belonging to a record in the first database is located as being distributed to records on a plurality of tables in said second database.

38. The client/server system according to claim 36, wherein said second database comprises the published service information indicating services published to clients and defining a format of a table of the services.

39. The client/server system according to claim 38, further comprising:

control means for restricting access of the server application to the first database depending on a load of a database server for managing the first database.

40. The client/server system according to claim 38, further comprising:

control means for restricting access of the client application, which accesses the first database through said second database, to said second database depending on the load of a database server for managing the first database.

41. The client/server system according to claim 38, wherein said server application is provided individually for each of the services published to the clients.

42. A client/server system comprising a client application and a server application which accesses a first database in cooperation with the client application, comprising:

a second database storing data transmitted between the client application and the server application, said second database comprising published service information indicating services published to clients and defining a format of a table of the service;

client request analyzing means for receiving data addressed from the client application to the server application and for entering the data in said second database;

server request analyzing means for retrieving from the database the data addressed to the server application and transmitting the data to the server application, wherein said server application accesses the first database based on data received from said server request analyzing means;

control means for restricting access to the first database of the server application assigned to each of the services published to the clients depending on an importance level set for each of the services published to the clients, wherein said server application is provided individually for each of the services published to the clients.

43. A client/server system comprising a client application and a server application which accesses a first database in cooperation with the client application, comprising:

a second database storing data transmitted between the client application and the server application, said second database comprising published service information indicating services published to clients and defining a format of a table of the service;

client request analyzing means for receiving data addressed from the client application to the server application and for entering the data in said second database;

server request analyzing means for retrieving from the database the data addressed to the server application and transmitting the data to the server application, wherein said server application accesses the first database based on data received from said server request analyzing means; and control means for restricting access of the client application, which accesses said second database provided by the service published to the clients, to said second database depending on an importance level of the service published to the clients.

44. A method of accessing a database of a client/server computer system, comprising the steps of:

writing by a client application data addressed to a server application to a first database, said first database storing published service information published for a client and storing according to the published service information the data, said published service information comprising information defining a format of stored data; and retrieving by said server application data requested by the client application from the first database and accessing a second database based on retrieved data, wherein an interface to the first database available to the client application is independent of an interface between the first database and the server application, and wherein the client application retrieves the published service information from the first database.

45. A database processing method operated in a database system of a client/server computer system, comprising the steps of:

writing by a client application data addressed to a server application to a first database, said first database storing published service information published for a client and storing according to the published service information the data;

retrieving by said server application data requested by the client application from the first database, accessing a second database according to retrieved data, generating response data addressed to the client application, and writing the generated data to the first database; and reading by the client application the response data from the first database, wherein an interface to the first database available to the client application is independent of an interface between the first database and the server application, and wherein the client application retrieves the published service information from the first database.

46. A method of transmitting a message between a client application and a server application in a client/server computer system, comprising the steps of:

writing by said client application to a database the message addressed to the server application, said database storing published service information published for a client and storing according to the published service information the message; and reading by said server application the message from the database, wherein an interface to the database available to the client application is independent of an interface between the database and the server application, and wherein the client application retrieves the published service information from the database.

47. A method of transmitting a message between a client application and a server application in a client/server computer system, comprising the steps of:

writing by said server application to a database a message addressed to the client application, said database storing published service information published for a client and storing according to the published service information the message; and reading by said client application the message from the database, wherein an interface to the database available to the client application is independent of an interface between the database and the server application, and wherein the client application retrieves the published service information from the database.

\* \* \* \* \*